United States Patent
Sato

(10) Patent No.: US 9,851,655 B2
(45) Date of Patent: Dec. 26, 2017

(54) IMAGE FORMING APPARATUS AND OPTICAL SCANNING APPARATUS

(71) Applicant: CANON KABUSHIKI KAISHA, Tokyo (JP)

(72) Inventor: Kazumi Sato, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/885,796

(22) Filed: Oct. 16, 2015

(65) Prior Publication Data

US 2016/0116858 A1    Apr. 28, 2016

(30) Foreign Application Priority Data

Oct. 22, 2014    (JP) .................... 2014-215617

(51) Int. Cl.
| | |
|---|---|
| B41J 2/385 | (2006.01) |
| G03G 15/043 | (2006.01) |
| G02B 26/12 | (2006.01) |
| G03G 15/01 | (2006.01) |

(52) U.S. Cl.
CPC ......... *G03G 15/043* (2013.01); *G02B 26/123* (2013.01); *G03G 15/0178* (2013.01); *G03G 2215/0158* (2013.01)

(58) Field of Classification Search
CPC ............... G03G 15/0178; G03G 15/43; G03G 2215/0158; G02B 26/123; G02B 26/124
See application file for complete search history.

(56) References Cited

U.S. PATENT DOCUMENTS

| | | | | |
|---|---|---|---|---|
| 5,828,925 | A  * | 10/1998 | Yoshizawa | ......... G03G 15/0194 347/116 |
| 7,149,021 | B2 | 12/2006 | Yoshizawa | .................... 359/216 |
| 7,570,386 | B2 * | 8/2009 | Heink | .................... H04N 1/047 347/116 |
| 7,778,579 | B2 * | 8/2010 | Ueda | .................. G03G 15/0194 347/116 |

(Continued)

FOREIGN PATENT DOCUMENTS

JP    4170736 B2    10/2008

OTHER PUBLICATIONS

U.S. Appl. No. 14/952,277, filed Nov. 25, 2015.

*Primary Examiner* — David Bolduc
(74) *Attorney, Agent, or Firm* — Fitzpatrick, Cella, Harper & Scinto

(57) ABSTRACT

An image forming apparatus, including: a temperature detecting element provided on an opposite side of a first and a second light sources with respect to a deflection unit in an optical box and provided between a first lens and a second lens, which a first and a second light beams emitted from the first and second light sources and deflected by a rotary polygon mirror enter first, respectively, the temperature detecting element being configured to detect an internal temperature of the optical box; and a control unit configured to control lighting-up timings based on image data of the first and second light sources based on a detection result of the temperature detecting element so that misregistration between a first toner image and a second toner image transferred from the first and second photosensitive members onto the sheet is suppressed.

34 Claims, 12 Drawing Sheets

(56) References Cited

U.S. PATENT DOCUMENTS

| | | | | |
|---|---|---|---|---|
| 2003/0156184 A1* | 8/2003 | Suzuki | G02B 26/123 | 347/249 |
| 2004/0085605 A1* | 5/2004 | Yoshizawa | G02B 7/181 | 359/216.1 |
| 2005/0007440 A1* | 1/2005 | Nishikawa | G03G 15/0131 | 347/232 |
| 2005/0062836 A1* | 3/2005 | Nakajima | G03G 15/011 | 347/225 |
| 2006/0153603 A1* | 7/2006 | Nishikawa | G03G 15/0194 | 399/301 |
| 2007/0132830 A1* | 6/2007 | Tamaru | G03G 15/011 | 347/238 |
| 2008/0055393 A1* | 3/2008 | Westerfield | B41J 2/471 | 347/259 |
| 2008/0253786 A1* | 10/2008 | Isobe | G03G 15/5004 | 399/69 |
| 2011/0007120 A1* | 1/2011 | Motoi | G03G 15/0415 | 347/116 |
| 2012/0007933 A1* | 1/2012 | Yamashita | G03G 15/043 | 347/118 |
| 2013/0016169 A1* | 1/2013 | Ohtoshi | G03G 15/04045 | 347/116 |
| 2013/0215211 A1* | 8/2013 | Koga | G03G 15/043 | 347/224 |
| 2013/0222870 A1* | 8/2013 | Iwami | H04N 1/00018 | 358/504 |
| 2013/0243452 A1* | 9/2013 | Nakae | G03G 15/011 | 399/44 |
| 2013/0286144 A1* | 10/2013 | Nakahata | G03G 15/0415 | 347/224 |
| 2014/0125751 A1* | 5/2014 | Ishikawa | G03G 15/04072 | 347/118 |
| 2014/0204431 A1* | 7/2014 | Tsuchiya | G02B 26/122 | 358/474 |
| 2014/0375742 A1* | 12/2014 | Otoguro | G03G 15/04045 | 347/118 |
| 2015/0042739 A1* | 2/2015 | Seki | G03G 15/043 | 347/118 |
| 2015/0125169 A1* | 5/2015 | Iwama | G03G 15/043 | 399/49 |
| 2015/0130884 A1* | 5/2015 | Kato | G03G 15/043 | 347/118 |
| 2015/0277082 A1* | 10/2015 | Otoguro | G03G 15/0435 | 359/205.1 |
| 2015/0293350 A1* | 10/2015 | Sato | G03G 15/043 | 347/118 |
| 2015/0301471 A1* | 10/2015 | Nakahata | G03G 15/0189 | 347/116 |

* cited by examiner

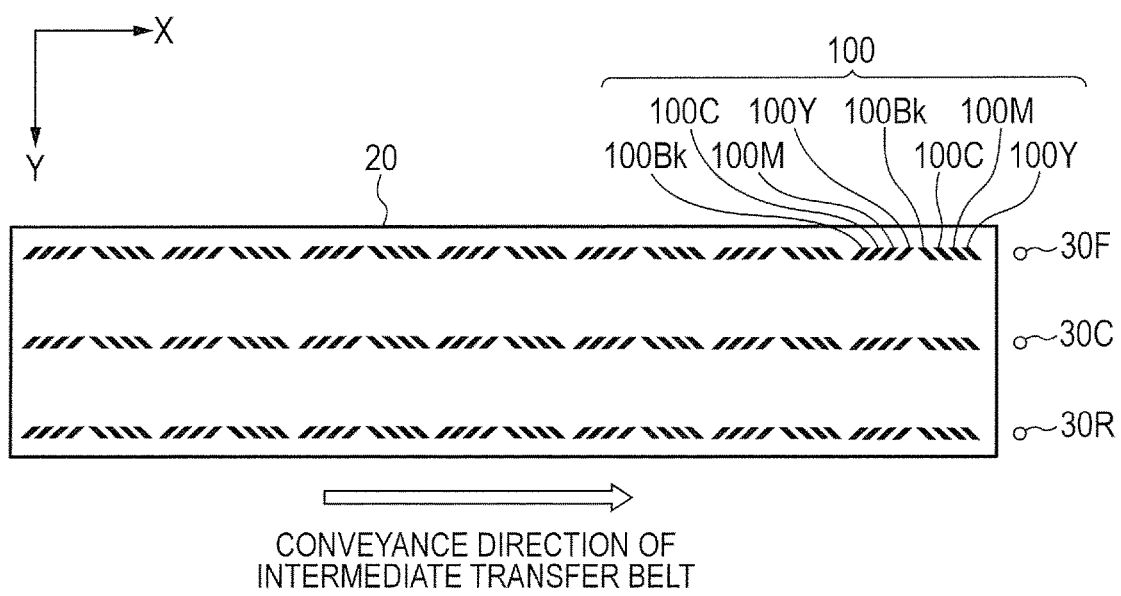

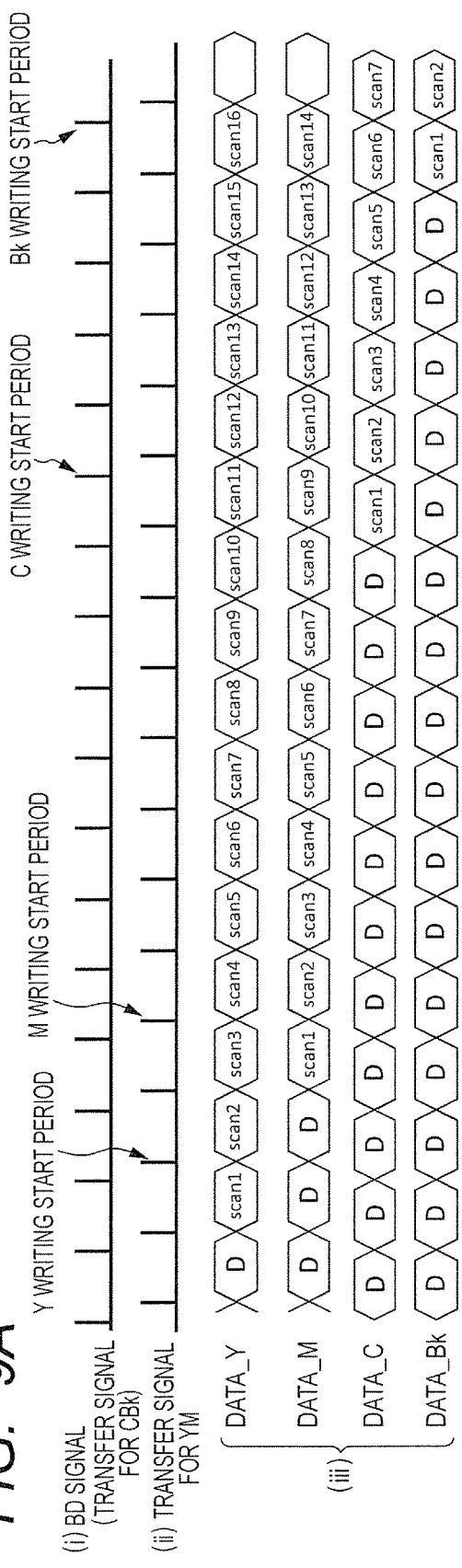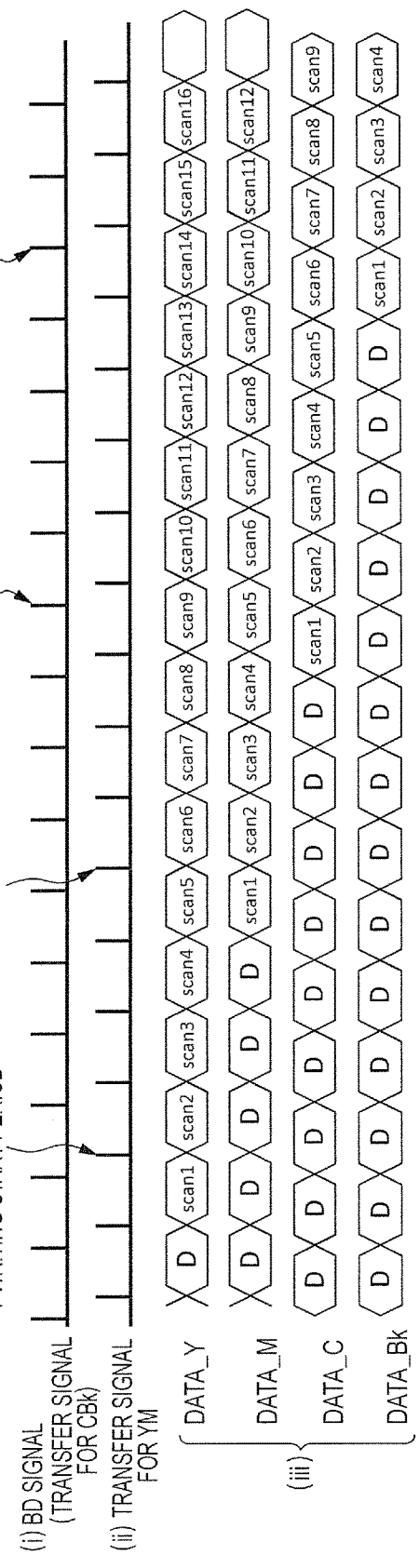

IMAGE FORMING APPARATUS AND OPTICAL SCANNING APPARATUS

BACKGROUND OF THE INVENTION

Field of the Invention

The present invention relates to an image forming apparatus such as a copying machine, a printer, a fax machine, or a multifunctional peripheral thereof, and more particularly, to a light scanning apparatus to be used in the image forming apparatus.

Description of the Related Art

As a light scanning apparatus to be used in an electrophotographic image forming apparatus, a light scanning apparatus having the following configuration is well known. Specifically, there has been known a light scanning apparatus configured to form an electrostatic latent image on a photosensitive member by deflecting a light beam emitted from a light source with a rotary polygon mirror and guiding the deflected light beam onto a photosensitive surface of the photosensitive member with optical components such as a lens and a mirror. An imaging optical system includes at least one fθ lens. The fθ lens has a special lens effective surface typified by an aspheric surface for the purpose of enhancing scanning characteristics. Further, a housing (hereinafter referred to as "optical box") for supporting and fixing members of an optical system is formed by resin molding due to the advantages such as securement of a degree of freedom of a shape, a reduction in weight, and a reduction in cost. In particular, use of an optical box made of a resin is greatly advantageous in a tandem type image forming apparatus, because the number of optical components to be used is large, and further mounting directions and mounting methods for supporting and fixing the optical components are not uniform. On the other hand, compared to an optical box made of a metal, the optical box made of a resin has a large expansion coefficient under the condition of an increased temperature. Further, compared to the optical box made of a metal, the optical box made of a resin has a low thermal conductivity. Therefore, when the optical box made of a resin is used, in the light scanning apparatus containing a heat source, a temperature distribution of the optical box itself becomes non-uniform, and a hot portion and a cold portion occur partially. As a result, warpage and local distortion in different directions occur in the optical box.

When the rotary polygon mirror is rotated, the light scanning apparatus is increased in temperature due to heat generated in a driving portion such as a motor. When the rotary polygon mirror is driven by the motor continuously for a long period of time, an IC chip and the like mounted in the light scanning apparatus to drive the motor and the rotary polygon mirror are increased in temperature. Moreover, even when the rotary polygon mirror is driven by the motor for a short period of time, temperatures of the motor and the IC chip fluctuate to increase logarithmically immediately after the start of the rotation of the motor. Therefore, the optical box is greatly distorted and deformed due to a biased increase in temperature in the light scanning apparatus. A lens, the rotary polygon mirror, a mirror, and the like forming the light scanning apparatus are contained in the optical box, and hence the attitudes of optical components such as the lens and the mirror change due to the deformation of the optical box, with the result that the route through which a light beam passes and a reflecting direction vary due to the deformation of the optical box passage of time.

As described above, due to the deformation of the optical box, light beams of stations of respective colors vary in different directions and in different amounts, which changes a light-condensing position on a surface to be scanned and thus varies a horizontal direction, a vertical direction, or a magnification of an image line, resulting in the degradation in image. In particular, in a tandem type image forming apparatus, a light beam position of each color varies, and hence color misregistration occurs when toner images of respective colors are superimposed. In order to solve the foregoing problem, there has been proposed a light scanning apparatus in which hot current of air generated from a rotary polygon mirror and the like is diffused along an inclined surface by forming a rib provided perpendicularly to the bottom portion of a housing main body in an inclined manner (Japanese Patent No. 4170736). There has also been proposed a method in which a temperature detecting unit is provided in the light scanning apparatus, a temperature is detected by the temperature detecting unit, a color misregistration amount is predicted based on the detected temperature, and color misregistration is corrected based on the predicted color misregistration amount.

However, in the method in which the temperature in the light scanning apparatus is detected by the temperature detecting unit and the color misregistration amount is predicted and corrected based on the detected temperature, predictive control of the color misregistration amount with an even higher accuracy is required along with an increase in image quality of the image forming apparatus.

SUMMARY OF THE INVENTION

The present invention has been made in view of the above-mentioned circumstances, and has an object to reduce color misregistration by arranging a temperature detecting unit at an appropriate position in a light scanning apparatus.

In order to solve the above-mentioned problem, according to one embodiment of the present invention, there is provided an image forming apparatus, comprising: a first photosensitive member; a second photosensitive member; a first light source configured to emit a first light beam to expose the first photosensitive member to the first light beam; a second light source configured to emit a second light beam to expose the second photosensitive member to the second light beam; a deflection unit including: a rotary polygon mirror configured to deflect the first light beam so that the first light beam scans the first photosensitive member, and deflect the second light beam so that the second light beam scans the second photosensitive member; a motor configured to rotate the rotary polygon mirror; a drive unit configured to drive the motor; and a board on which the motor and the drive unit are mounted, the rotary polygon mirror being configured to deflect the first light beam and the second light beam toward different sides across the rotary polygon mirror; a first optical element group configured to guide the first light beam deflected by the rotary polygon mirror to the first photosensitive member, the first optical element group including a first lens which the first light beam deflected by the rotary polygon mirror enters first; a second optical element group configured to guide the second light beam deflected by the rotary polygon mirror to the second photosensitive member, the second optical element group including a second lens which the second light beam deflected by the rotary polygon mirror enters first; an optical box configured to contain the deflection unit, the first lens, and the second lens so that the deflection unit is located between the first lens and the second lens; a temperature detecting element provided in the optical box on an opposite side of the first light source and the second light source with respect to the deflection unit in a scanning direction of the first light beam or the second light beam deflected by the rotary polygon mirror, and provided between the first lens and the second lens in an optical axis direction of one of the first lens and the second lens, the temperature detecting element being configured to detect an internal temperature of the optical box; a first developing unit configured to develop an electrostatic latent image, which is formed on the first photosensitive member by scanning the first light beam on the first photosensitive member, with a toner into a first toner image; a second developing unit configured to develop an electrostatic latent image, which is formed on the second photosensitive member by scanning the second light beam on the second photosensitive member, with a toner different in a color from the toner used by the first developing unit into a second toner image; a transfer unit configured to transfer the first toner image developed by the first developing unit and the second toner image developed by the second developing unit onto a sheet; and a control unit configured to control lighting-up timings based on image data of the first light source and the second light source based on a detection result of the temperature detecting element so that misregistration between the first toner image and the second toner image on the sheet is suppressed.

Further features of the present invention will become apparent from the following description of exemplary embodiments with reference to the attached drawings.

BRIEF DESCRIPTION OF THE DRAWINGS

FIG. 7 is a view illustrating a toner image for detecting color misregistration in the embodiment.

FIGS. 9A and 9B are diagrams illustrating transfer timings of image data of respective colors in the embodiment.

DESCRIPTION OF THE EMBODIMENTS

Now, exemplary embodiments of the present invention will be described in detail with reference to the drawings.

In the following description, a rotation axis direction of a rotary polygon mirror 42 of a deflection device 43, which will be described later, is defined as a Z-axis direction, a main scanning direction, which is a scanning direction of a light beam, or a longitudinal direction of optical lenses 60 and reflecting mirrors 62, which will be described later, is defined as a Y-axis direction, and a direction orthogonal to a Y axis and a Z axis is defined as an X-axis direction.

Configuration of Image Forming Apparatus

Figure 1A:
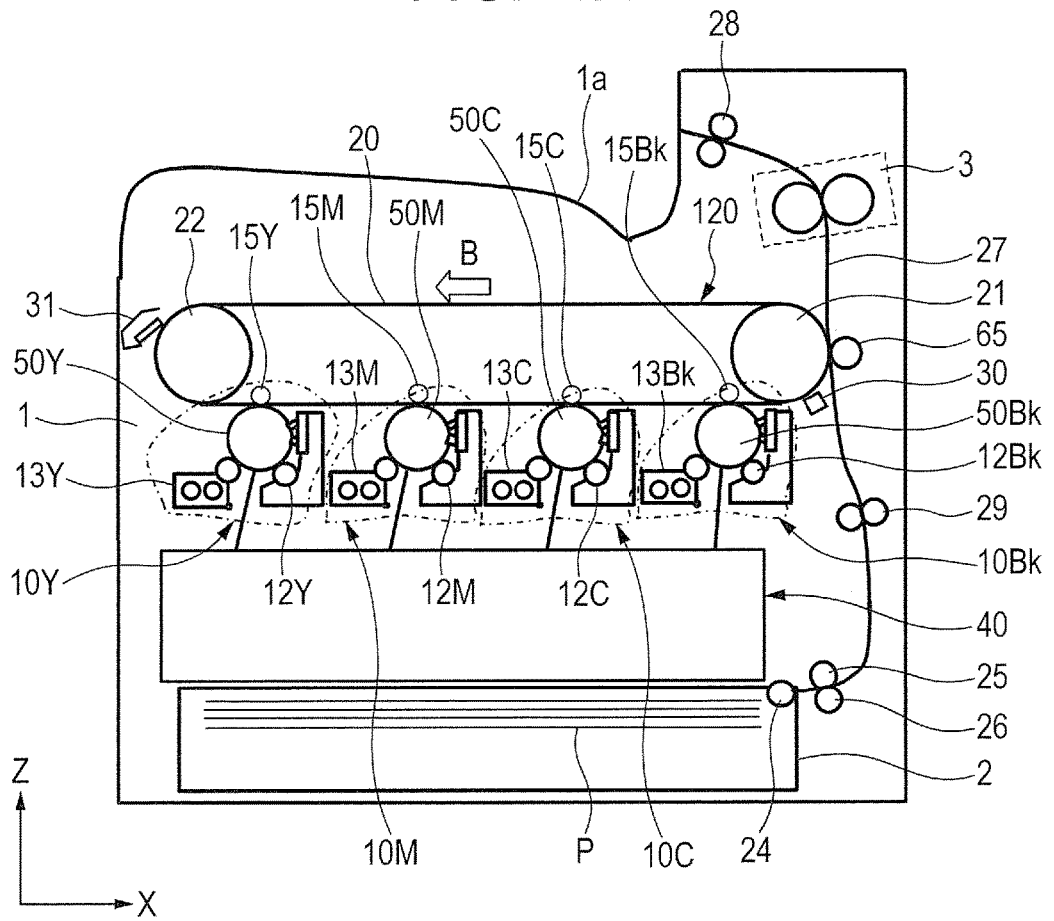
FIG. 1A is a view illustrating a configuration of an image forming apparatus according to an embodiment.

The configuration of an image forming apparatus according to an embodiment of the present invention will be described. FIG. 1A is a schematic structural view illustrating an entire configuration of a tandem type color laser beam printer of the embodiment. The laser beam printer (hereinafter referred to simply as "printer") includes four image forming engines 10Y, 10M, 10C, and 10Bk (indicated by the dashed-dotted lines) configured to form toner images for respective colors of yellow (Y), magenta (M), cyan (C), and black (Bk). Further, the printer includes an intermediate transfer belt 20 onto which a toner image is transferred from each of the image forming engines 10Y, 10M, 10C, and 10Bk. Then, the printer is configured in such a manner that the toner images multiply transferred onto the intermediate transfer belt 20 are transferred onto a recording sheet P serving as a recording medium to form a full-color image. Note that, unless otherwise necessary, the reference symbols Y, M, C, and Bk indicating the colors are hereinafter omitted.

The intermediate transfer belt 20 is formed into an endless shape and is carried over a pair of belt conveyance rollers 21 and 22 so that a toner image formed by each image forming engine 10 is transferred onto the intermediate transfer belt 20 while the intermediate transfer belt 20 is rotating in a direction indicated by the arrow B. Further, a secondary transfer roller 65 is provided at a position opposed to one belt conveyance roller 21 across the intermediate transfer belt 20. The recording sheet P is inserted between the secondary transfer roller 65 and the intermediate transfer belt 20 which are held in press-contact with each other, with the result that a toner image is transferred onto the recording sheet P from the intermediate transfer belt 20. The four image forming engines 10Y, 10M, 10C, and 10Bk described above are provided in parallel on a lower side of the intermediate transfer belt 20 so that a toner image formed in accordance with image information of each color is transferred onto the intermediate transfer belt 20 (hereinafter referred to as "primary transfer"). The four image forming engines 10 are provided in the following order: the image forming engine 10Y for yellow, the image forming engine 10M for magenta, the image forming engine 10C for cyan, and the image forming engine 10Bk for black in a rotation direction (direction indicated by the arrow B) of the intermediate transfer belt 20.

Further, a light scanning apparatus (an optical scanning apparatus) 40 configured to expose a photosensitive drum 50 serving as a photosensitive member provided in each image forming engine 10 to light in accordance with image information is provided below the image forming engine 10. Note that, the detailed illustration and description of the light scanning apparatus 40 are omitted in FIG. 1A and described later with reference to FIG. 1B. The light scanning apparatus 40 is shared by all the image forming engines 10Y, 10M, 10C, and 10Bk and includes four semiconductor lasers (not shown) configured to emit a light beam modulated in accordance with image information of each color. Further, the light scanning apparatus 40 includes a deflection device (deflection unit) 43 which includes a rotary polygon mirror 42 configured to rotate at high speed to deflect each light beam so that the light beams of four optical paths scan the photosensitive drums 50 in a rotation axis direction (Y-axis direction) and a motor unit 41 configured to rotate the rotary polygon mirror 42. The deflection device 43 includes the rotary polygon mirror 42, a motor configured to rotate the rotary polygon mirror 42, the motor unit 41 serving as a drive unit configured to drive the motor, and a board 64 on which the motor and the motor unit 41 are mounted (see FIG. 10, etc.). Each light beam deflected by the deflection device 43 travels through a predetermined route while being guided by optical members provided in the light scanning apparatus 40. Then, each light beam which has travelled through the predetermined route exposes each photosensitive drum 50 of each image forming engine 10 to light through each irradiation port (not shown) formed in an upper portion of the light scanning apparatus 40.

Further, each image forming engine 10 includes the photosensitive drum 50 and a charging roller 12 configured to charge the photosensitive drum 50 to a uniform background potential. Further, each image forming engine 10 includes a developing device (developing unit) 13 configured to form a toner image by developing an electrostatic latent image formed on the photosensitive drum 50 (photosensitive member) by exposure to the light beam. The developing device 13 forms a toner image in accordance with image information of each color on the photosensitive drum 50 serving as a photosensitive member.

A primary transfer roller 15 is provided at a position opposed to the photosensitive drum 50 of each image forming engine 10 across the intermediate transfer belt 20. When a predetermined transfer voltage is applied to the primary transfer roller 15, a toner image on the photosensitive drum 50 is transferred onto the intermediate transfer belt 20.

On the other hand, the recording sheet P is supplied from a feed cassette 2 contained in a lower portion of a printer housing 1 to an inner portion of the printer, specifically a secondary transfer position at which the intermediate transfer belt 20 and the secondary transfer roller 65 come into abutment with each other. In an upper portion of the feed cassette 2, a pickup roller 24 configured to pull out the recording sheet P contained in the feed cassette 2 and a feed roller 25 are provided in parallel. Further, a retard roller 26 configured to prevent overlap feeding of the recording sheet P is provided at a position opposed to the feed roller 25. A conveyance route 27 of the recording sheet P inside the printer is provided substantially vertically along a right side surface of the printer housing 1. The recording sheet P pulled out from the feed cassette 2 positioned in a bottom portion of the printer housing 1 ascends through the conveyance route 27 and is sent to registration rollers 29 configured to control an entry timing of the recording sheet P with respect to the secondary transfer position. After that, a toner image is transferred onto the recording sheet P at the secondary transfer position, and then the recording sheet P is sent to a fixing device 3 (indicated by the broken line) provided on a downstream side in the conveyance direction. Then, the recording sheet P on which the toner image is fixed by the fixing device 3 is delivered to a delivery tray 1a provided in an upper portion of the printer housing 1 through delivery rollers 28.

In the rotation direction of the intermediate transfer belt 20, a sensor 30 is provided on a downstream side of a photosensitive drum 50Bk serving as a second photosensitive member and on an upstream side of the secondary transfer roller 65. The sensor 30 is configured to detect a toner image for detecting color misregistration (toner pattern), which is formed on the intermediate transfer belt 20 and will be described later.

Further, in the rotation direction of the intermediate transfer belt 20, a cleaning device 31 is provided on a downstream side of the secondary transfer roller 65 and on an upstream side of a photosensitive drum 50Y serving as a first photosensitive member. The cleaning device 31 is configured to recover a toner remaining on the intermediate transfer belt 20 without being transferred onto the recording sheet P, and the toner image for detecting color misregistration detected by the sensor 30.

When a full-color image is formed by the color laser beam printer configured as described above, first, the light scanning apparatus 40 exposes the photosensitive drum 50 of each image forming engine 10 to light at a predetermined timing in accordance with image information of each color. Consequently, a toner image in accordance with the image information is formed on the photosensitive drum 50 of each image forming engine 10. In order to obtain satisfactory image quality, it is necessary to reproduce the position of an electrostatic latent image formed by the light scanning apparatus 40 with high accuracy.

Configuration of Light Scanning Apparatus

Figure 1B:
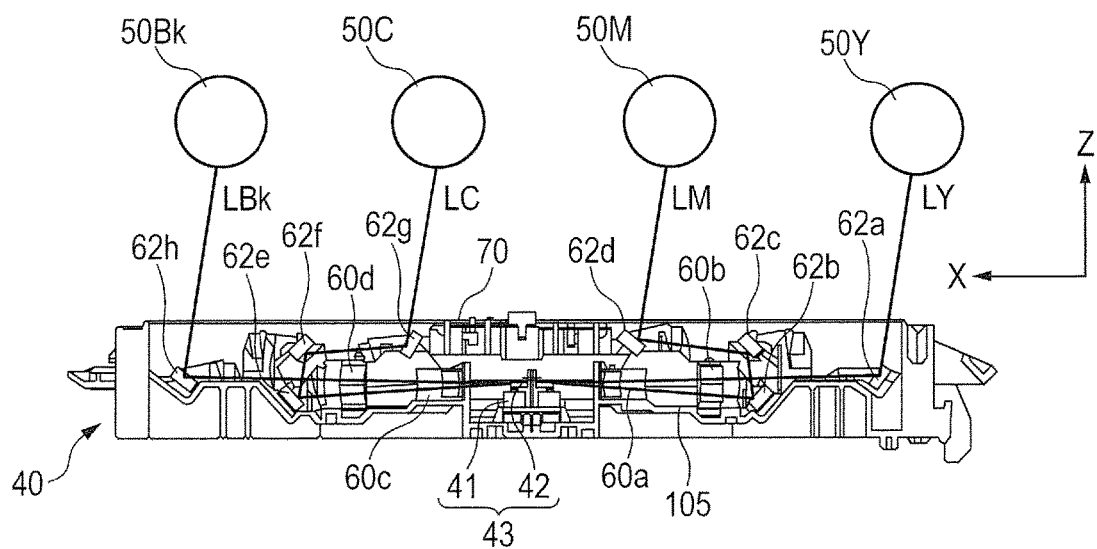
FIG. 1B is a view illustrating a configuration of a light scanning apparatus in the embodiment.
Figure 2:
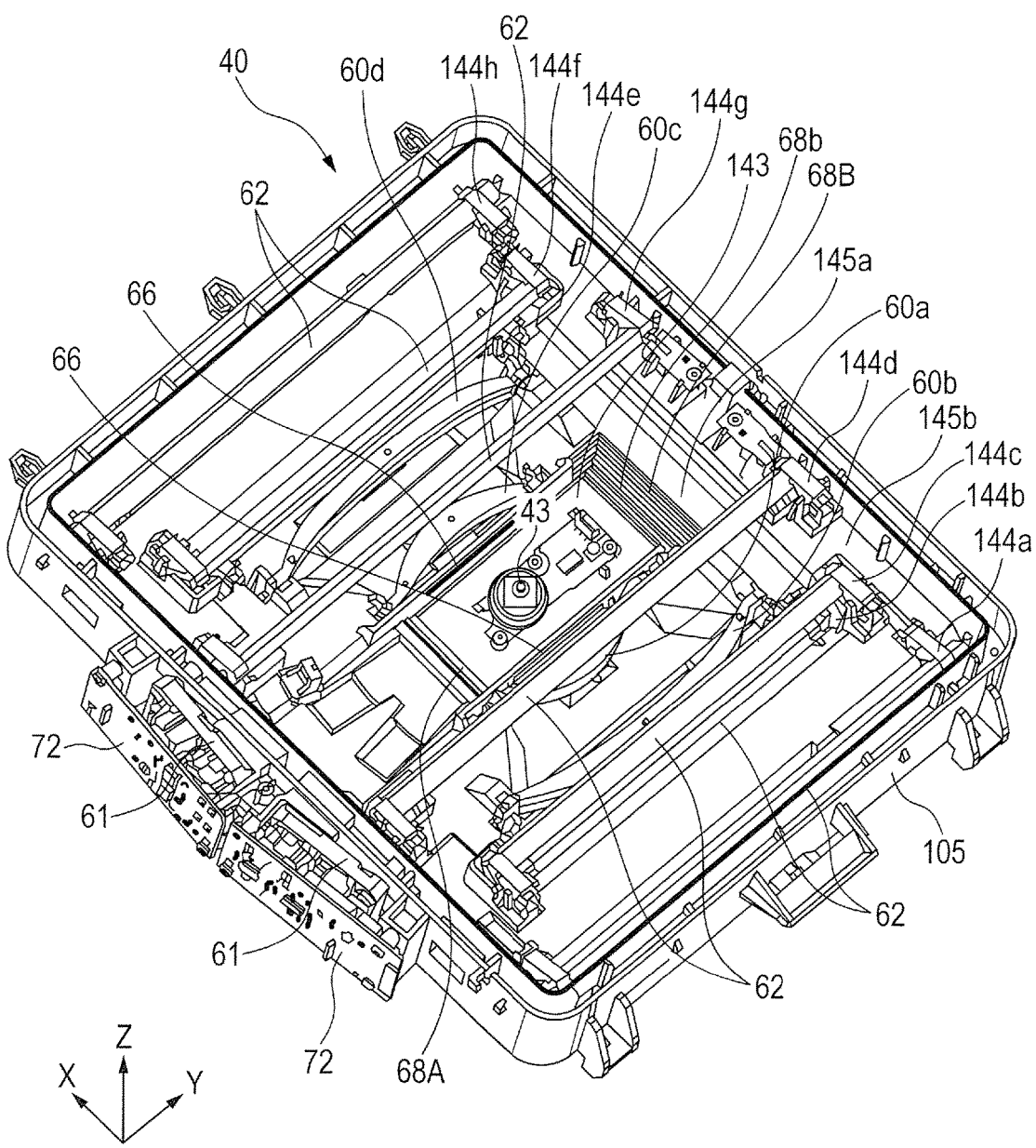
FIG. 2 is a view illustrating a configuration of the light scanning apparatus in the embodiment.

FIG. 1B is a schematic view illustrating an entire image when the optical components are mounted, and FIG. 2 is a view illustrating the configuration of the light scanning apparatus 40 of the embodiment. Note that, the light scanning apparatus 40 includes an optical box 105 and a cover 70 configured to cover an opening of an upper portion of the optical box 105. A light source unit 61 on which a light source configured to emit a light beam is mounted and the deflection device 43 including the rotary polygon mirror 42 configured to deflect a light beam and the motor unit 41 are installed in an outer peripheral portion of and inside the light scanning apparatus 40. Further, the light scanning apparatus 40 includes a plurality of optical lenses 60 (60a to 60d) and a plurality of reflecting mirrors 62 (62a to 62h) configured to guide each light beam onto the photosensitive drum 50 to image the light beam. A first optical element group 161 (FIG. 6) includes the optical lenses 60a and 60b, and the reflecting mirrors 62a, 62b, 62c, and 62d. The first optical element group 161 guides light beams deflected by the rotary polygon mirror to the photosensitive members 50Y and 50M. A second optical element group 162 (FIG. 6) includes the optical lenses 60c and 60d, and the reflecting mirrors 62e, 62f, 62g, and 62h. The second optical element group 162 guides light beams deflected by the rotary polygon mirror 42 to the photosensitive members 50C and 50Bk. The optical box 105 includes an installation surface 143 on which the deflection device 43 is installed and support surfaces 145a and 145b located on the photosensitive drum 50 side (photosensitive member side) with respect to the rotary polygon mirror 42, on which support portions 144a, 144b, 144c, 144d, 144e, 144f, 144g, and 144h configured to support at least one of the reflecting mirrors 62a to 62h are formed.

A light beam (first light beam) LY corresponding to the photosensitive drum (first photosensitive member) 50Y emitted from the light source unit 61 is deflected by the rotary polygon mirror 42 and enters the optical lens 60a. The optical lens (first lens) 60a is an optical member that the light beam LY enters first among the lenses and the mirrors provided on the optical path of the light beam LY. An optical axis of the optical lens 60a is in a direction substantially parallel to the X axis illustrated in FIG. 1A and FIG. 1B. The light beam LY having passed through the optical lens 60a enters the optical lens 60b, and passes through the optical lens 60b to be reflected by the reflecting mirror 62a. The light beam LY reflected by the reflecting mirror 62a scans the photosensitive drum 50Y through a transparent window (not shown).

A light beam (first light beam) LM corresponding to the photosensitive drum (first photosensitive member) 50M emitted from the light source unit 61 is deflected by the rotary polygon mirror 42 and enters the optical lens 60a. The optical lens 60a is an optical member that the light beam LM enters first among the lenses and the mirrors provided on the optical path of the light beam LM. The light beam LM having passed through the optical lens 60a enters the optical lens 60b, and passes through the optical lens 60b to be reflected by the reflecting mirrors 62b, 62c, and 62d. The light beam LM reflected by the reflecting mirror 62d scans the photosensitive drum 50M through a transparent window (not shown).

Electrostatic latent images formed on the photosensitive drums 50Y and 50M when the photosensitive drums 50Y and 50M are scanned with the light beams LY and LM are developed with toners into toner images (first toner image) by developing devices (first developing unit) 13Y and 13M.

A light beam (second light beam) LC corresponding to the photosensitive drum (second photosensitive member) 50C emitted from the light source unit 61 is deflected by the rotary polygon mirror 42 and enters the optical lens 60c. The optical lens (second lens) 60c is an optical member that the light beam LC enters first among the lenses and the mirrors provided on the optical path of the light beam LC. An optical axis of the optical lens 60c is in a direction substantially parallel to the X axis illustrated in FIG. 1A and FIG. 1B. Note that, the optical lens 60a and the optical lens 60c are installed in the optical box so that the optical axis of the optical lens 60c in the light scanning apparatus in the embodiment is parallel to the optical axis of the optical lens 60a. The optical box contains the deflection device 43, the optical lens 60a, and the optical lens 60c therein so that the deflection device 43 is located between the optical lens 60a and the optical lens 60c. The light beam LC having passed through the optical lens 60c enters the optical lens 60d, and passes through the optical lens 60d to be reflected by the reflecting mirrors 62e, 62f, and 62g. The light beam LC reflected by the reflecting mirror 62g scans the photosensitive drum 50C through a transparent window (not shown).

A light beam (second light beam) LBk corresponding to the photosensitive drum (second photosensitive member) 50Bk emitted from the light source unit 61 is deflected by the rotary polygon mirror 42 and enters the optical lens 60c. The optical lens 60c is an optical member that the light beam LBk enters first among the lenses and the mirrors provided on the optical path of the light beam LBk. The light beam LBk having passed through the optical lens 60c enters the optical lens 60d, and passes through the optical lens 60d to be reflected by the reflecting mirror 62h. The light beam LBk reflected by the reflecting mirror 62h scans the photosensitive drum 50Bk through a transparent window (not shown).

Electrostatic latent images formed on the photosensitive drums 50C and 50Bk when the photosensitive drums 50C and 50Bk are scanned with the light beams LC and LBk are developed with toners into toner images (second toner image) by developing devices (second developing unit) 13C and 13Bk.

The toner images developed by the developing devices 13Y, 13M, 13C, and 13Bk are transferred onto the sheet P by a transfer unit 120. The transfer unit 120 includes primary transfer rollers 15Y, 15M, 15C, and 15Bk, the intermediate transfer belt 20, the belt conveyance rollers 21 and 22, and the secondary transfer roller 65.

FIG. 2 is an illustration of the light scanning apparatus 40 with the cover 70 removed so that the inside of the optical box 105 is visible, and is an illustration of a configuration of the embodiment. The light source unit 61 on which the light source configured to emit a light beam is mounted and the deflection device 43 configured to reflect and deflect the light beam are installed in an outer peripheral portion of and inside the light scanning apparatus 40. Further, the optical lens 60 and the reflecting mirror 62 required for guiding a light beam onto the photosensitive drum 50 to image the light beam are installed in the light scanning apparatus 40.

The light beam deflected by the rotary polygon mirror 42 passes through the optical lens 60a or 60c having a strong power in the main scanning direction (Y-axis direction), and is then guided to the optical lens 60b or 60d having a strong power in a sub-scanning direction (X-axis direction). The light beam having passed through the first optical lens 60a or 60c and the second optical lens 60b or 60d is reflected at least once by the reflecting mirror 62 and guided to the photosensitive drum 50 serving as a member to be scanned to form an image.

The image forming apparatus according to the embodiment will be described for convenience as an apparatus capable of forming an image having a resolution of 600 dpi. The light scanning apparatus 40 (in particular, a rotation speed of the rotary polygon mirror 42) is set so that an interval of scan lines reflected by adjacent reflecting surfaces of the rotary polygon mirror 42 to scan the photosensitive drums 50 is equivalent to 600 dpi (≈42.3 μm). In other words, an emission timing of a light beam may be advanced or delayed by one reflecting surface of the rotary polygon mirror 42 to move a position of the image by ±42.3 μm in the sub-scanning direction.

(Regarding Rib of Stepped Portion)

A stepped portion 68B including a plurality of steps 68b is formed between the installation surface 143 on which the deflection device 43 is installed and the support surfaces 145a and 145b on which the support portions 144a to 144h configured to support at least one of the reflecting mirrors 62a to 62h are formed.

The slope of the stepped portion 68B of the embodiment is configured so as to cross a plane (plane parallel to the XY-plane) that passes through a deflection point for deflecting a light beam and is perpendicular to a deflection plane (plane parallel to the Z-axis) from a lower side to an upper side. With this configuration, hot current of air which has blown out due to high-speed rotation of the rotary polygon mirror 42 of the deflection device 43 can be reliably guided and sent to the surrounding. In addition thereto, the stiffness of the optical box 105 can be enhanced by forming a rib through use of a space generated by the difference in height of the stepped portion 68B.

Further, the stepped portions 68 of the embodiment are configured so that the height from the bottom surface of the optical box 105 becomes larger in the stepped portion 68B in a direction opposite to the light source unit 61 with respect to the deflection device 43, than in a stepped portion 68A formed between the deflection device 43 and the light source unit 61. That is, the height of the stepped portion 68A formed in a direction having a height limit on an incident light side of a light beam is set to be smaller than that of the stepped portion 68B formed on an opposite side thereto. Consequently, a space (also referred to as "sectional space") through which a light beam does not pass can be used effectively, and the stiffness of the optical box 105 can be further enhanced. Moreover, the optical box 105 is made of a resin, and the stepped portions 68 are formed integrally with the optical box 105.

(Regarding Light Blocking Walls)

In the embodiment, in order to prevent flare light from entering other image forming engines 10 to irradiate other photosensitive drums 50, light blocking walls 66 serving as first and second walls for preventing the flare light are formed between the deflection device 43 and the optical lens (first lens) 60a and between the deflection device 43 and the optical lens (second lens) 60c. Light beam passage portions (slits) configured to allow the light beams deflected by the rotary polygon mirror 42 to pass therethrough are formed in the light blocking walls 66. As used herein, the flare light refers to unintended light reflected by each lens surface. The light blocking walls 66 are formed in parallel to a YZ-plane as illustrated in FIG. 2. More specifically, the light blocking walls 66 are formed in parallel to a plane that intersects the light beams deflected by the deflection device 43, and are formed to be erected from the installation surface 143 on which the deflection device 43 is installed. A seating surface configured to determine the position of the optical lens 60a or 60c in the optical axis direction is provided in a part of the light blocking wall 66. In general, with design including such a configuration, a large scanning field angle is obtained so that the light scanning apparatus 40 can be miniaturized.

Figure 3A:
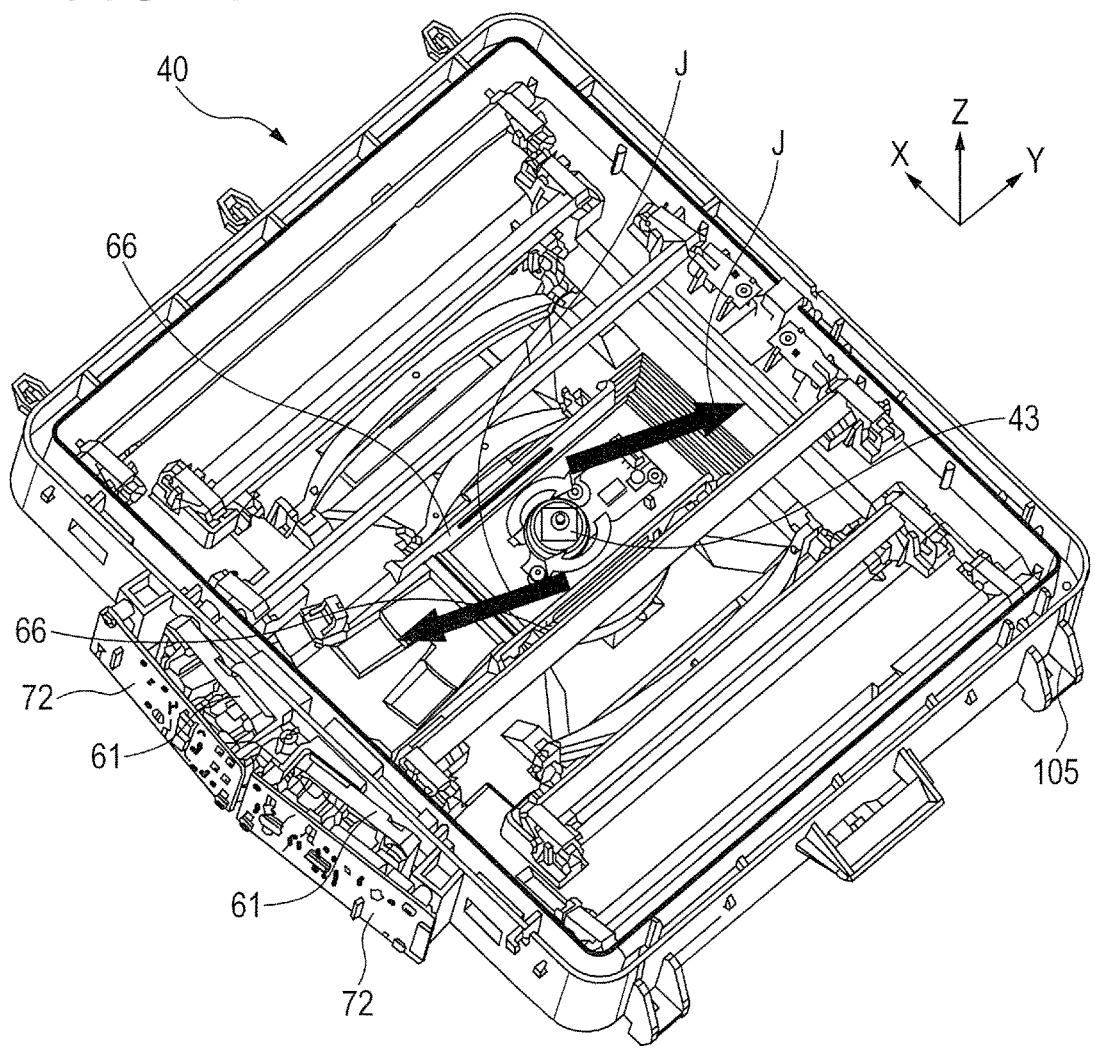
FIGS. 3A and 3B are views illustrating airflows of a deflection device and a configuration of light blocking walls of the light scanning apparatus in the embodiment.
Figure 3B:
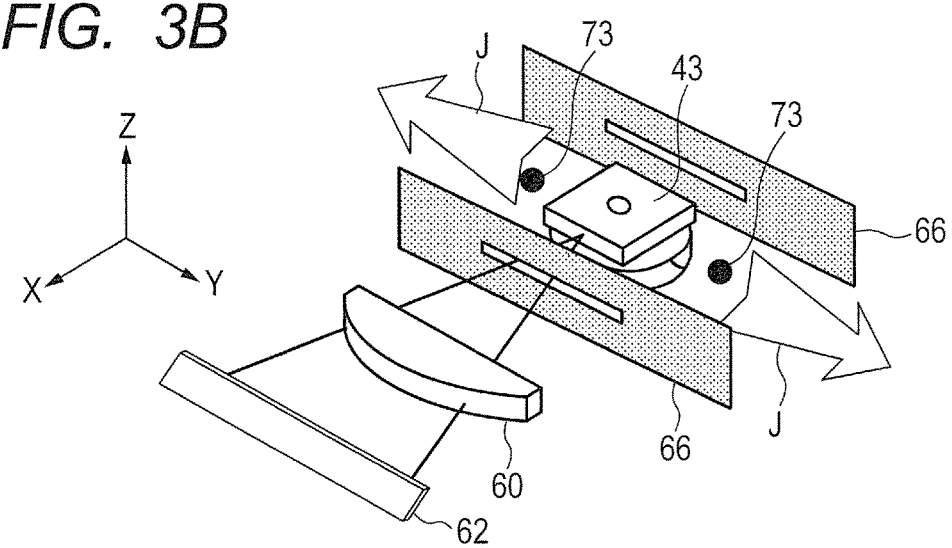

Now, FIG. 3A is a view as seen obliquely from above of an inside of the optical box 105 with the cover 70 removed. Moreover, FIG. 3B is a view illustrating only a main part in the view of FIG. 3A. As illustrated in FIG. 3A, due to the presence of the light blocking wall 66 in the vicinity of the deflection device 43, an airflow generated when the deflection device 43 rotates in a clockwise direction (direction indicated by the outlined arrow of FIG. 3A) in the case where the optical box 105 is viewed from above strongly blows out in directions of the arrows J. That is, in an apparatus of type in which a light beam is deflected in a counter direction as in the light scanning apparatus of the embodiment, hot current of air flows in a great amount toward the stepped portion 68, and hence the efficiency for absorbing thermal deformation is improved. Note that, the light blocking wall 66 has a wall shape rising in the Z-axis direction, and hence the deformation of the light blocking wall 66 does not influence warpage and the like of the entire optical box 105, if any.

Moreover, heat generated by the operation of the deflection device 43 deforms the optical box 105, and hence varies attitudes of optical components of the reflecting mirrors 62 and the optical lenses 60. Then, the variations in attitudes of the optical components cause images formed by the light beams irradiated on the photosensitive drums 50 of the respective image forming engines 10 to be shifted, which leads to color misregistration. In the related art, there has been proposed a method in which a temperature in the light scanning apparatus is measured, and a color misregistration amount is predicted and corrected based on the measured temperature. However, predictive control of the color misregistration amount with an even higher accuracy is required along with an increase in image quality. Therefore, in the embodiment, as illustrated in FIG. 3B, a configuration in which a temperature of airflow portions 73, which are generated by the deflection device 43 between the light blocking walls 66 and indicated by the black circles in FIG. 3B, is measured to reduce variations in irradiation positions of the light beams at the time of the increase in temperature in the light scanning apparatus 40 will be described.

[Relationship Between Change in Ambient Temperature and Color Misregistration Amount]

Figure 4A:
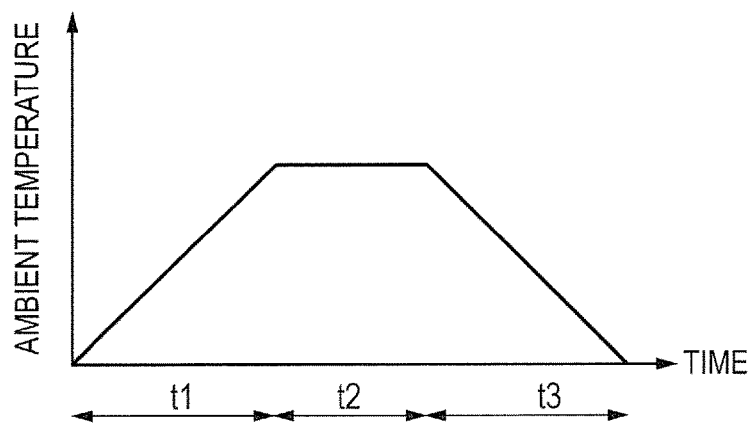
FIG. 4A is a graph showing a relationship between time and an ambient temperature of the light scanning apparatus.
Figure 4B:
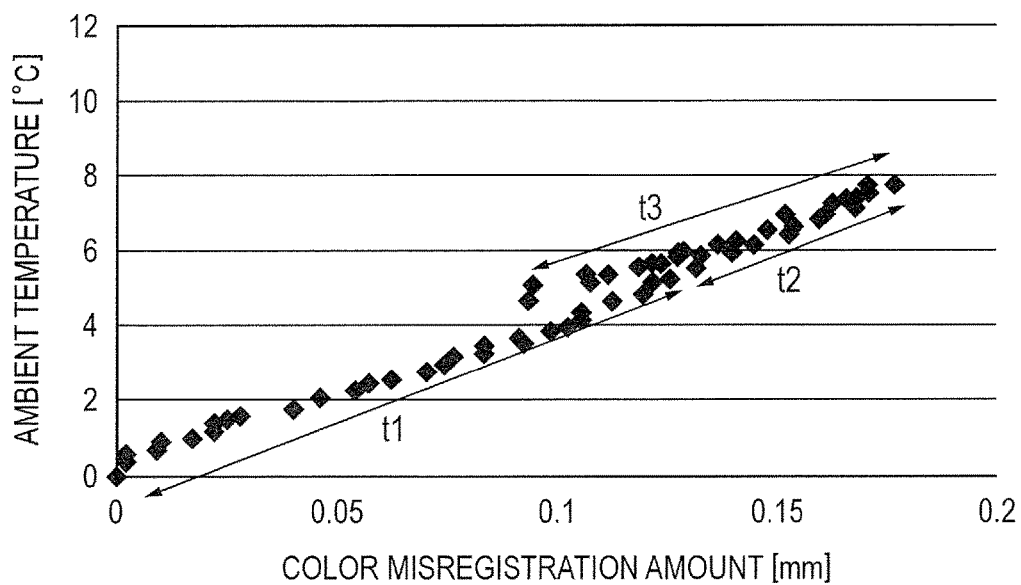
FIG. 4B is a graph showing a relationship between the ambient temperature of the light scanning apparatus and a color misregistration amount in the embodiment.

FIG. 4B is a result of detecting the temperature between the light blocking walls 66 to measure the color misregistration amount generated by the variations in irradiation positions of the light beams. In FIG. 4A, the horizontal axis indicates time, and the vertical axis indicates an ambient temperature of the light scanning apparatus 40, and more specifically, a temperature of a control board 72 on which the light source unit 61, which is provided on an outer side of a side wall of the light scanning apparatus 40, is mounted. The temperature of the control board 72 of the light source unit 61 can be regarded as the temperature in the image forming apparatus. Moreover, FIG. 4A is a graph showing a case where, with reference to a predetermined temperature, the ambient temperature of the light scanning apparatus 40 is increased in a section t1, the ambient temperature is stabilized in a section t2, and the ambient temperature is decreased in a section t3 back to the predetermined temperature. FIG. 4B is a graph showing a relationship between an amount of change in temperature and the color misregistration amount in a case where the ambient temperature of the light scanning apparatus 40 is changed as shown in FIG. 4A, and in a case where the temperature is measured (detected) by a thermistor (temperature detecting element) 75 at the airflow portions 73 in FIG. 3B. The thermistor 75 is provided in the optical box on the opposite side of the light source with respect to the deflection device 43 in the scanning direction (Y-axis direction) of the light beam. In addition, the thermistor 75 is provided between the optical lens 60a and the optical lens 60c in the optical axis direction (X-axis direction) of the optical lens 60a or the optical lens 60c to detect an internal temperature of the optical box, and will be described later in detail. In FIG. 4B, the color misregistration amount (mm) is plotted on the horizontal axis, and a difference in temperature (° C.) of the measured temperature with respect to a temperature measured by the thermistor 75 when the ambient temperature is a predetermined temperature (for example, 20° C.) is plotted on the vertical axis.

In FIG. 4B, while the ambient temperature is increasing in the section t1, the measured temperature is also increased, and the color misregistration amount is gradually increased along with the increase in temperature at the airflow portions 73. In the section t2 in which the ambient temperature is in a constant temperature state, under the effect of the increase in temperature in the section t1, the measured temperature continues to be increased, and hence the color misregistration amount is increased. In the section t3 in which the ambient temperature is decreased, the measured temperature is decreased, and further the color misregistration amount is reduced along with the decrease in measured temperature. As shown in FIG. 4B, in a case where the measured temperature and the color misregistration amount are in a proportional relationship, the color misregistration amount may be predicted based on the measured temperature.

[Correction of Color Misregistration Amount]

(Block Diagram of Image Forming Apparatus)

Figure 5:
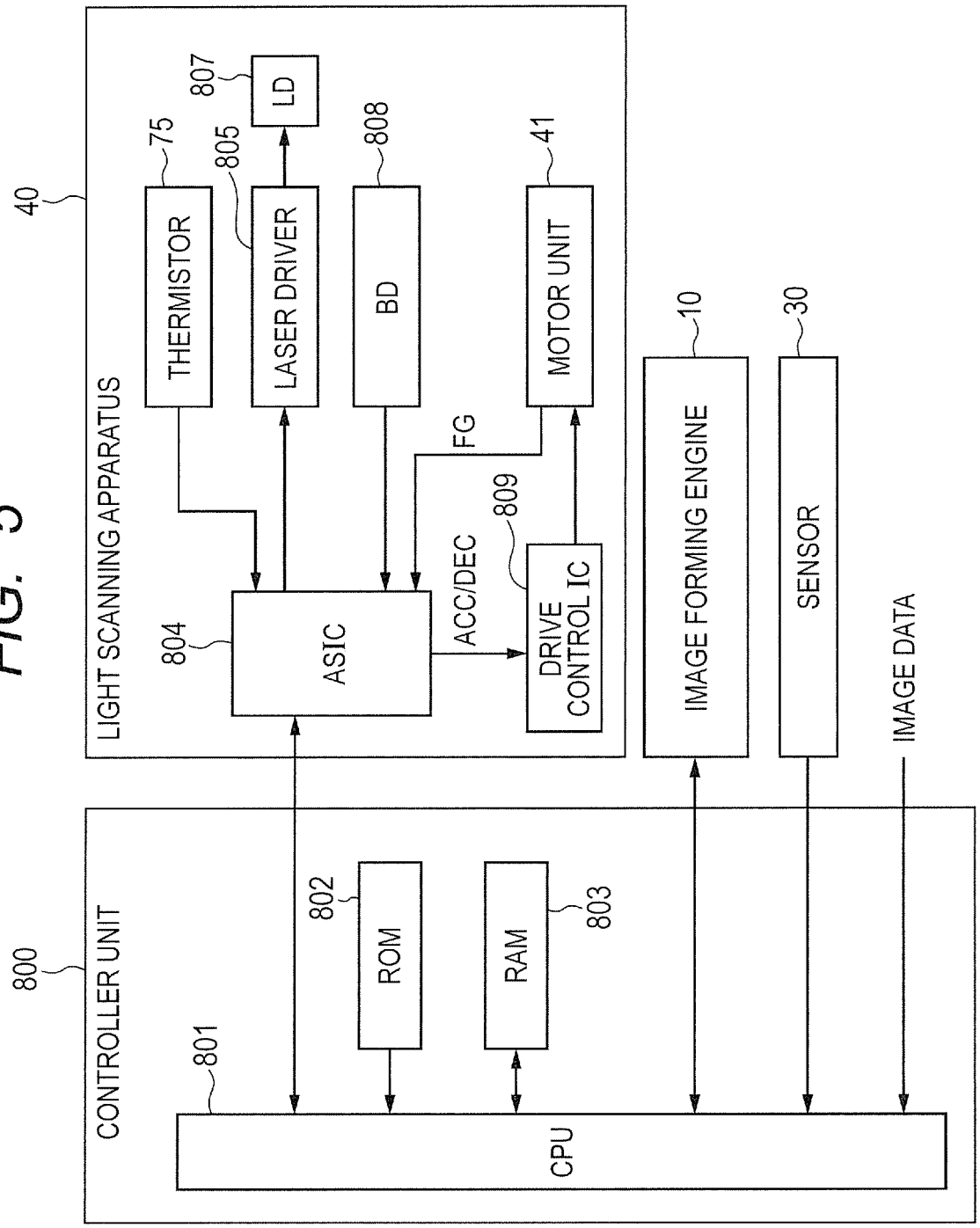
FIG. 5 is a block diagram of the image forming apparatus according to the embodiment.

Now, color misregistration correction processing in the embodiment will be described. FIG. 5 is a block diagram of the image forming apparatus according to the embodiment. A controller unit (control unit) 800 includes a CPU 801 configured to control respective parts of the image forming apparatus. The CPU 801 controls the respective parts of the image forming apparatus in accordance with various programs stored in a ROM 802 using a RAM 803 as a work area in executing the various programs. The CPU 801 controls the light scanning apparatus 40 and the image forming engines 10 based on input image data to form an image on the recording sheet P.

The light scanning apparatus 40 includes an ASIC 804, and the ASIC 804 controls a laser driver 805 and a drive control IC 809. More specifically, the ASIC 804 controls whether or not to emit light by laser diodes (hereinafter referred to as "LDs") 807 via the laser driver 805. In this case, the LDs 807 mean LDs 807 (Y and M) configured to emit the light beams LY and LM, and LDs 807 (C and Bk) configured to emit the light beams LC and LBk (see FIG. 6). The ASIC 804 also outputs an acceleration signal (represented by "ACC" in FIG. 5) or a deceleration signal (represented by "DEC" in FIG. 5) to the drive control IC 809 based on a frequency generator (FG) signal input from the motor unit 41. The drive control IC 809 controls the motor unit 41 based on the input acceleration signal or deceleration signal to control driving of the rotary polygon mirror 42.

Figure 6:
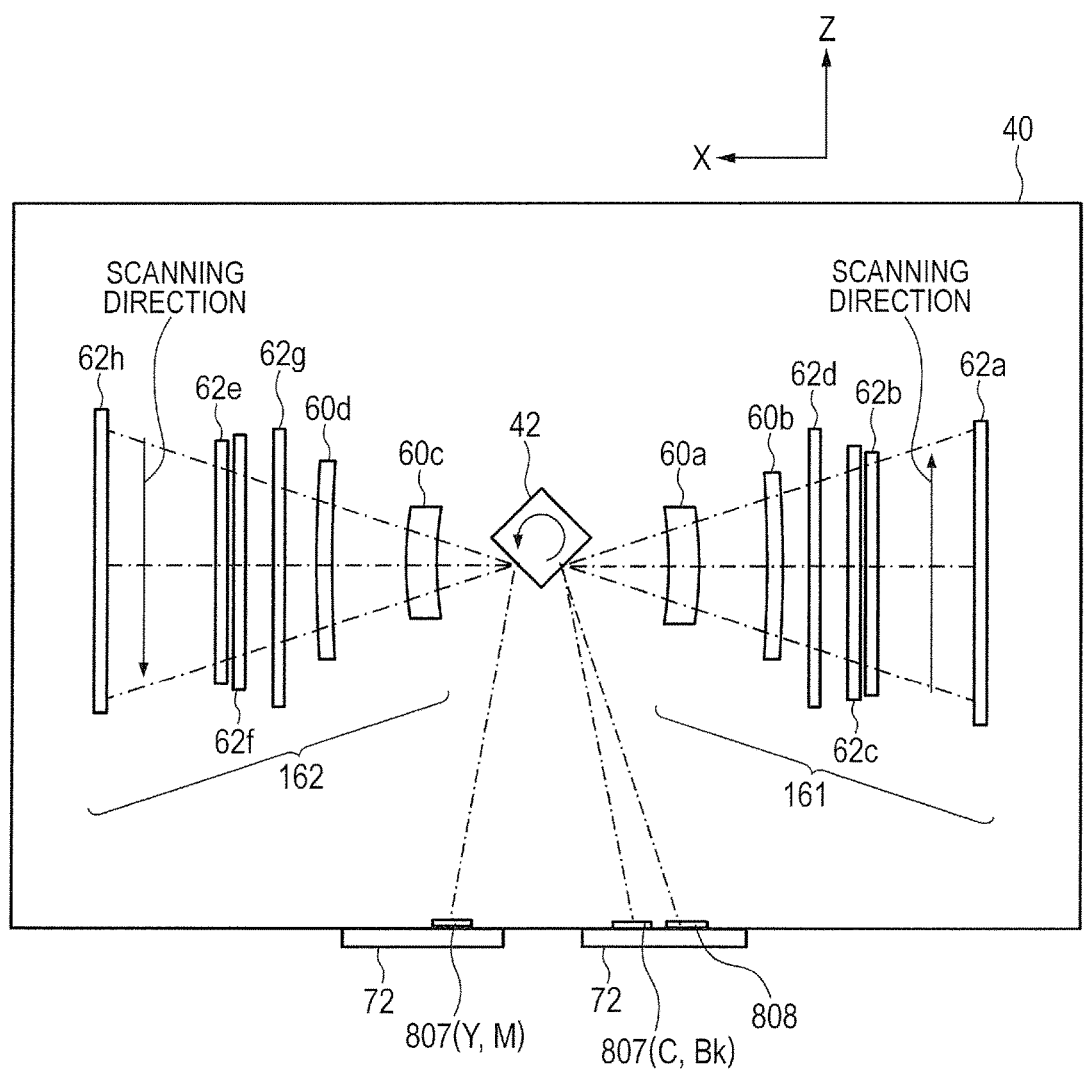
FIG. 6 is a view as seen from above of the light scanning apparatus in the embodiment.

The light scanning apparatus 40 includes a beam detector (hereinafter referred to as a BD) 808. The BD 808 in the embodiment is mounted on the control board 72 on which the cyan and black LDs 807 (C and Bk) are mounted as illustrated in FIG. 6. Now, FIG. 6 is a view illustrating only main components when the light scanning apparatus 40 is viewed from a positive direction of the Z axis. In FIG. 6, the optical paths of the light beams are indicated by the dashed-dotted lines. In the embodiment, the black light beam LBk enters the BD 808. The ASIC 804 controls each of an emission timing of the cyan light beam LC and an emission timing of the black light beam LBk based on a BD signal output from the BD 808. The control of the emission timings (lighting-up timing) allows a writing start position of an yellow toner image, a writing start position of a magenta toner image, a writing end position of a cyan toner image, and a writing end position of a black toner image in the Y-axis direction to be substantially matched. The control of the emission timings also allows a writing end position of the yellow toner image, a writing end position of the magenta toner image, a writing start position of the cyan toner image, and a writing start position of the black toner image in the Y-axis direction to be substantially matched. Moreover, transfer timings of cyan and black image data to be transferred from the CPU 801 to the ASIC 804 are also started based on the BD signal, and hence the BD signal may be regarded as a transfer signal for CBk.

Moreover, the ASIC 804 outputs the BD signal output from the BD 808 to the CPU 801, and the CPU 801 generates and outputs a transfer signal for YM to the ASIC 804 based on the BD signal input from the ASIC 804. The ASIC 804 controls each of an emission timing of the yellow light beam LY and an emission timing of the magenta light beam LM based on the input transfer signal for YM. Moreover, transfer timings of yellow and magenta image data to be transferred from the CPU 801 to the ASIC 804 are also started based on the transfer signal for YM. Here, the transfer signal for YM may be generated by the ASIC 804 based on the BD signal. Note that, as illustrated in FIG. 6, the light beams LY and LM obliquely enter the rotary polygon mirror 42, and hence when the light beams LY and LM are emitted in synchronization with the BD signal output from the BD 808 that the light beam LBk enters, misregistration occurs. Therefore, the emission timings of the light beams LY and LM are synchronized with the transfer signal for YM, which is generated based on the BD signal. The same applies to the transfer timings of the yellow and magenta image data. Angles of incidence of the light beams LY and LM on the rotary polygon mirror 42 are determined in design, and hence a generation timing of the transfer signal for YM is also determined in advance. The sensor 30 will be described later.

(Toner Image for Detecting Color Misregistration)

FIG. 7 is a view illustrating the toner image for detecting color misregistration in the embodiment, and is a view illustrating the intermediate transfer belt 20 when viewed from a negative direction of the Z axis in FIG. 1A. In performing color misregistration correction, the CPU 801 forms the toner image for detecting color misregistration illustrated in FIG. 7 on the intermediate transfer belt 20. Note that, information on the toner image for detecting color misregistration is stored in advance in the ROM 802. The toner image for detecting color misregistration formed on the intermediate transfer belt 20 is detected by the sensor 30.

The toner image for detecting color misregistration is formed, for example, in both end portions and a center portion of the intermediate transfer belt 20 in the main scanning direction (Y-axis direction), and is detected by the sensor 30 provided to be opposed to the position at which the toner image for detecting color misregistration is formed. More specifically, the sensor includes sensors 30F and 30R, which are configured to detect the toner image for detecting color misregistration formed in the both end portions of the intermediate transfer belt 20, and a sensor 30C, which is configured to detect the toner image for detecting color misregistration formed in the center portion.

The toner image for detecting color misregistration includes, for example, from the head in a conveyance direction of the intermediate transfer belt 20, an yellow patch 100Y, a magenta patch 100M, a cyan patch 100C, and a black patch 100Bk. A pattern 100 in which those patches 100Y to 100Bk are formed with a predetermined inclination with respect to the main scanning direction is repeatedly formed for a predetermined length in the conveyance direction of the intermediate transfer belt 20.

The sensor 30 detects edges of the respective patches 100Y to 100Bk, and outputs a detection result to the CPU 801. The CPU 801 detects, with reference to the yellow patch 100Y, for example, distances to the edges of the patches 100M to 100Bk of the other colors, respectively, to determine the color misregistration amount of each color with respect to yellow. The CPU 801 sets a correction amount (hereinafter referred to as "color misregistration correction reference value") of each color with respect to yellow based on the determined color misregistration amount. Note that, the color misregistration correction reference value set by the CPU 801 by detecting the toner image for detecting color misregistration by the sensor 30 does not take information on the color misregistration resulting from the change in temperature in the light scanning apparatus 40 into consideration.

(Color Misregistration Correction Processing)

Figure 8A:
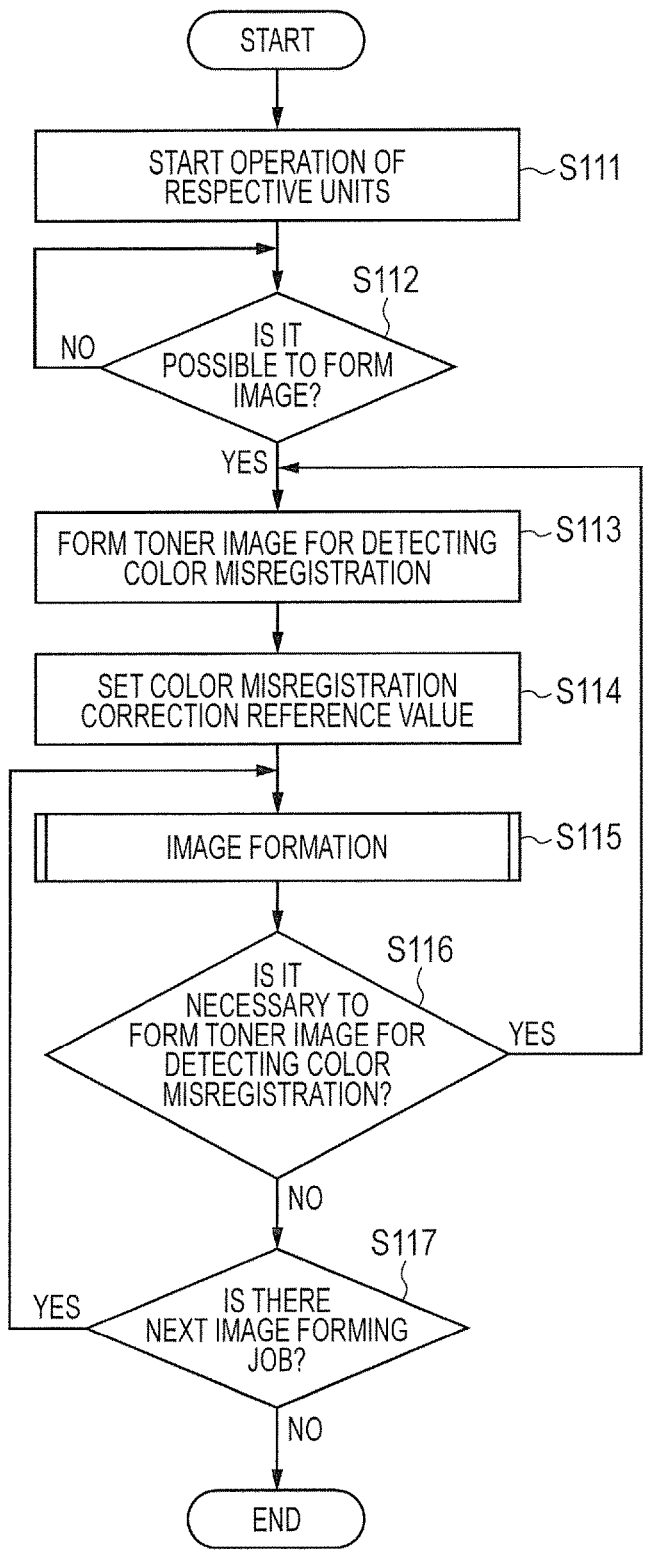
FIG. 8A is a flowchart illustrating color misregistration correction processing in the embodiment.

FIG. 8A is a flowchart illustrating the color misregistration correction processing of the embodiment executed by the CPU 801. The CPU 801 starts the following processing when the image forming apparatus is powered on. In Step S111, the CPU 801 starts operation of respective units of the image forming apparatus. In Step S112, the CPU 801 determines whether or not it is possible to form an image, and when it is not possible to form an image, the processing of Step S112 is repeated. When determining in Step S112 that it is possible to form an image, the CPU 801 forms the toner image for detecting color misregistration illustrated in FIG. 7 on the intermediate transfer belt 20 in Step S113. In Step S114, the CPU 801 sets the color misregistration correction reference value based on the result of detecting the toner image for detecting color misregistration by the sensor 30 as described above. In Step S115, the CPU 801 performs image formation. Note that, the processing of Step S115 will be described later.

In Step S116, the CPU 801 determines whether or not it is necessary to form the toner image for detecting color misregistration. When determining in Step S116 that it is necessary to form the toner image for detecting color misregistration, the CPU 801 returns to the processing of Step S113. For example, when the number of recording sheets P on which the image formation has been performed, which has been counted by a counter (not shown), reaches a predetermined number such as 1,000, the CPU 801 determines that it is necessary to form the toner image for detecting color misregistration. Moreover, based on a detection result by a temperature detecting unit, which is different from the thermistor 75 and installed in the image forming apparatus, the CPU 801 determines that it is necessary to form the toner image for detecting color misregistration. When it is determined in Step S116 that it is not necessary to form the toner image for detecting color misregistration, the CPU 801 proceeds to processing of Step S117. In Step S117, the CPU 801 determines whether or not there is a next image forming job, and when it is determined that there is a next image forming job, returns to the processing of Step S115. When determining that there is no next image forming job in Step S117, the CPU 801 ends the processing.

Figure 8B:
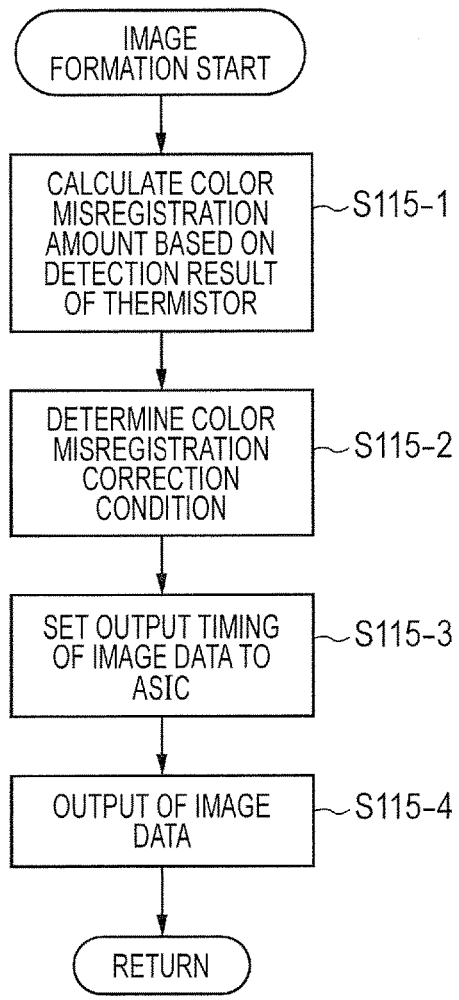
FIG. 8B is a flowchart illustrating image formation processing in the embodiment.

FIG. 8B is a flowchart illustrating image formation processing executed by the CPU 801 in the processing of Step S115 of FIG. 8A. In Step S115-1, as described with reference to FIG. 4B, the CPU 801 calculates the color misregistration amount resulting from the change in temperature in the light scanning apparatus 40 based on the detection result of the thermistor 75. For example, in a case where the amount of change in temperature is 4° C. from the detection result of the thermistor 75, the color misregistration amount is 0.1 mm from FIG. 4B. Note that, in FIG. 5, the detection result of the thermistor 75 is output to the CPU 801 via the ASIC 804, but the detection result of the thermistor 75 may be output directly to the CPU 801.

In Step S115-2, the CPU 801 determines a color misregistration correction condition based on the color misregistration correction reference value, which is determined in Step S114, and the color misregistration amount based on the detection result of the thermistor 75, which is calculated in Step S115-1. In Step S115-3, the CPU 801 sets output timings (also referred to as "transfer timings") of the image data to the ASIC 804 based on the color misregistration correction condition determined in Step S115-2.

Now, referring to FIG. 9A and FIG. 9B, control of the transfer timings of the image data of respective colors from the CPU 801 to the ASIC 804 will be described. FIG. 9A is a diagram for illustrating the transfer timings of the image data of respective colors after the correction based on the color misregistration correction reference value obtained by executing the processing of Step S114 of FIG. 8A. In other words, in FIG. 9A, the color misregistration amount resulting from the change in temperature in the light scanning apparatus 40 is not taken into consideration. Part (i) in FIG. 9A indicates the BD signal (transfer signal for CBk) output by the BD 808. Part (ii) in FIG. 9A indicates the transfer signal for YM generated by the CPU 801.

Part (iii) in FIG. 9A is a diagram for illustrating the transfer timings of the image data of respective colors output from the CPU 801 to the ASIC 804. More specifically, DATA_Y, DATA_M, DATA_C, and DATA_Bk represent yellow image data, magenta image data, cyan image data, and black image data, respectively. The hexagons indicate data for one scan transferred from the CPU 801 to the ASIC 804 in response to transfer signals for respective colors. The notation "scan1" and the like indicate the image data corresponding to the image formed on the recording sheet P, and "D" indicates that there is no image data corresponding to the image formed on the recording sheet P.

For example, the CPU 801 starts the transfer of the magenta image data with a delay of two scans from the start of the transfer of the yellow image data based on the color misregistration correction reference value set in Step S114. Similarly, the CPU 801 starts the transfer of the cyan image data and the transfer of the black image data with delays of 10 scans and 15 scans from the start of the transfer of the yellow image data, respectively. Note that, the notation "Y writing start period" and the like in Parts (i) and (ii) of FIG. 9A indicate timings at which the light beams of respective colors start to be irradiated. The timing at which the transfer of the image data is started in Part (iii) of FIG. 9A is set so that, in consideration of a time delay and the like in the transfer of the image data, the transfer is started at least one period prior to writing start periods of respective colors.

FIG. 9B is a diagram for illustrating the output timings of the image data set in Step S115-3. Parts (i) to (iii) of FIG. 9B correspond to Parts (i) to (iii) of FIG. 9A. For example, when the amount of change in temperature from the predetermined temperature is 4° C., the color misregistration amount is about 0.1 mm as shown in FIG. 4B. In a case where the image forming apparatus of 600 dpi is assumed as described above, the color misregistration amount of 0.1 mm corresponds to approximately 2 scans. Therefore, as illustrated in Part (iii) of FIG. 9B, the transfer of the magenta image data is started with a further delay of 2 scans from that in Part (iii) of FIG. 9A, that is, at a timing that is 4 scans after the start of the transfer of the yellow image data.

Note that, a scanning direction for cyan and black is opposite to a scanning direction for yellow and magenta as illustrated in FIG. 6, and hence a direction in which magenta is shifted is opposite to a direction in which cyan and black are shifted. Therefore, the transfer of each of the cyan and black image data is started 2 scans prior to that in Part (iii) of FIG. 9A. More specifically, the transfer of the cyan image data is advanced 2 scans ahead of that in Part (iii) of FIG. 9A to be started at a timing that is 8 scans after the start of the transfer of the yellow image data. The transfer of the black image data is advanced 2 scans ahead of that in Part (iii) of FIG. 9A to be started at a timing that is 13 scans after the start of the transfer of the yellow image data. Note that, in FIG. 9A and FIG. 9B, in order to simplify the description, the distance between the photosensitive drums 50 is subtracted for the illustration.

In Step S115-4, as described with reference to Part (iii) of FIG. 9B, the CPU 801 outputs the image data to the ASIC 804 based on the color misregistration correction amount based on the result of detecting the toner image for detecting color misregistration by the sensor 30 and the result of detecting the temperature by the thermistor 75.

[Selection of Temperature Measurement Points]

Figure 10:
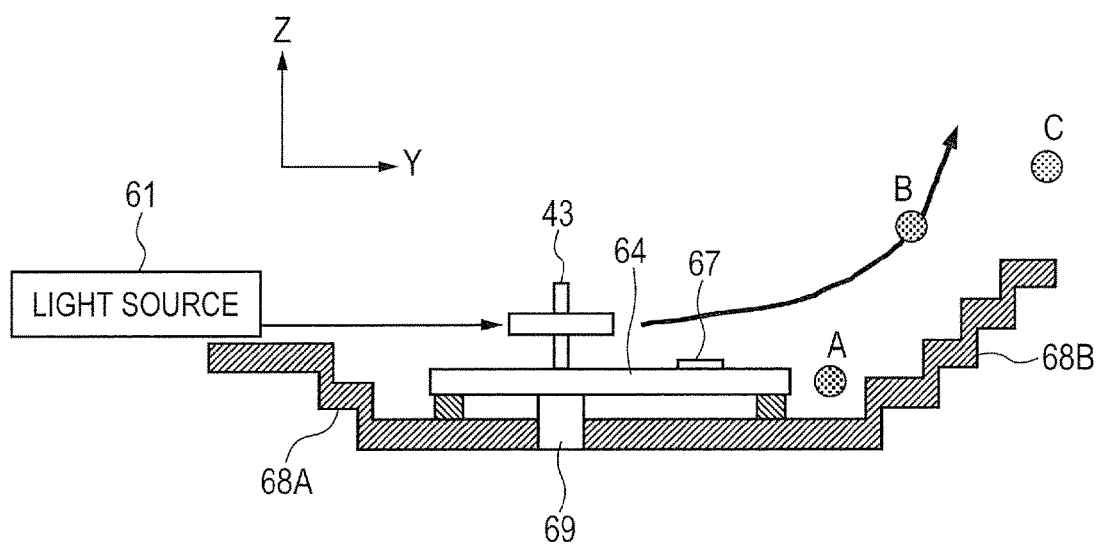
FIG. 10 is a view illustrating temperature measurement points of the light scanning apparatus in the embodiment.

Next, in the embodiment, points at which the temperature is measured (hereinafter simply referred to as "temperature measurement points") between the light blocking walls 66 are located on the opposite side of the light source unit 61 with respect to the deflection device 43 as illustrated in FIG. 10. More specifically, the temperature measurement points in the embodiment are a temperature measurement point A, a temperature measurement point B, and a temperature measurement point C, all of which are located on the opposite side of the light source unit 61 with respect to the deflection device 43. Heat generation sources in the light scanning apparatus 40 are a bearing portion 69 of the deflection device 43 and an IC 67 configured to control the deflection device 43. Therefore, the temperature measurement points need to be points which do not block the light beams irradiated from the light source unit 61, which are capable of correctly measuring effects of the two heat sources: the bearing portion 69 and the IC 67, and which are capable of correctly grasping variations in irradiation positions of the light beams.

Figure 11A:
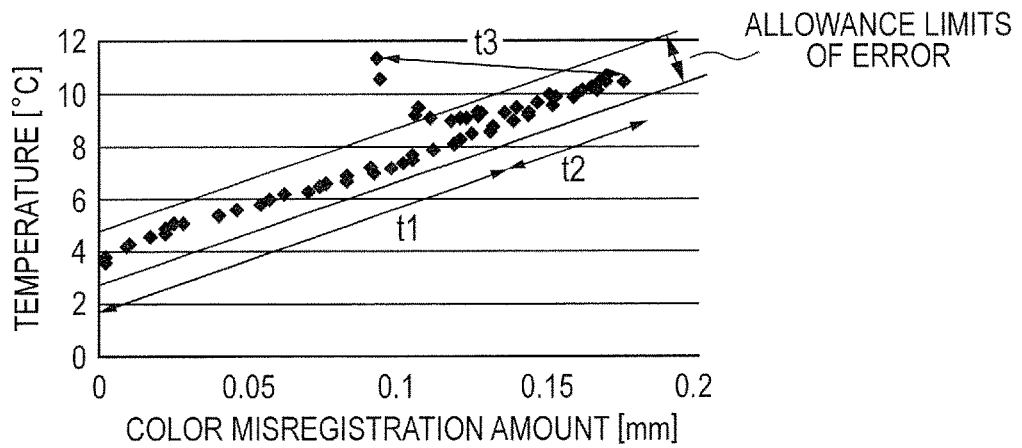
FIGS. 11A, 11B and 11C are graphs showing temperatures at different measurement points and a color misregistration amount in the embodiment.
Figure 11B:
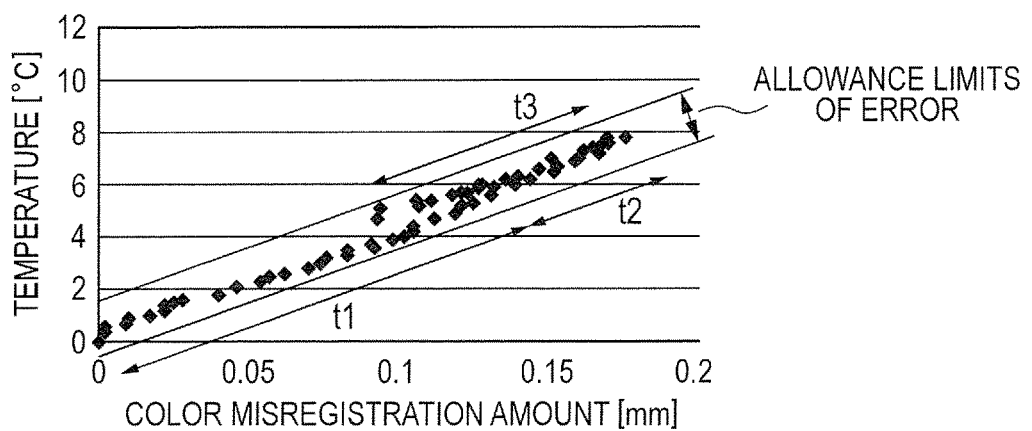
Figure 11C:
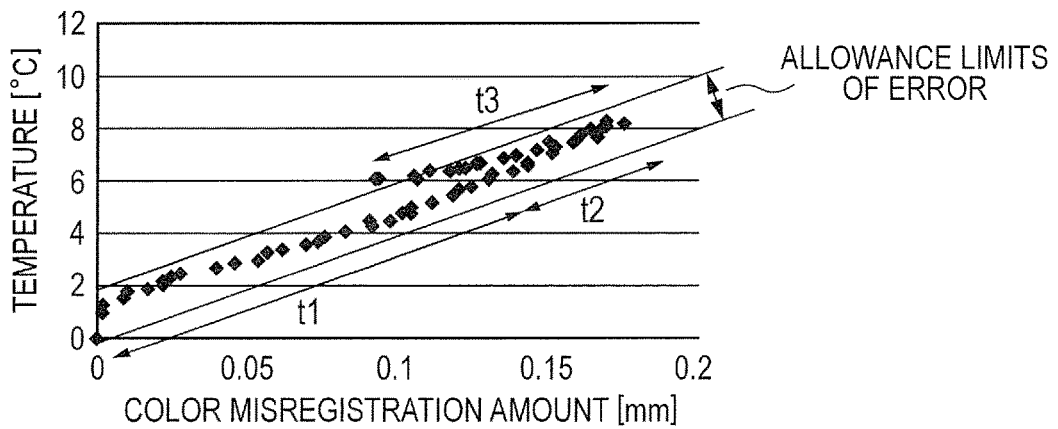

In each of FIG. 11A, FIG. 11B, and FIG. 11C, a relationship of the measured temperature at the respective temperature measurement points A, B, and C between the light blocking walls 66 illustrated in FIG. 10 and a color misregistration amount with respect to the change in ambient temperature similar to that in FIG. 4A is shown. Note that, the vertical axis in each of the graphs of FIG. 11A, FIG. 11B, and FIG. 11C indicates, similarly to FIG. 4B, a difference in temperature of the measured temperature with reference to the temperature measured by the thermistor 75 when the ambient temperature is the predetermined temperature. In FIG. 11A, a result at the temperature measurement point A is shown, and the temperature measurement point A is a point which is close to the bearing portion 69 and the IC 67 as the heat sources but which hardly receives the airflows generated by the rotation of the deflection device 43. As shown in FIG. 11A, at the temperature measurement point A, in the section t1 in which the ambient temperature is increased and in the section t2, the color misregistration amount and the measured temperature are in the proportional relationship. However, in the section t3 in which the ambient temperature is decreased, the characteristic significantly deviates from those in the section t1 and the section t2, and the proportional relationship does not hold between the color misregistration amount and the measured temperature. Therefore, the plotted values exceed predetermined limits of error (hereinafter referred to as "allowance limits of error"), which are indicated by the solid lines in FIG. 11A, FIG. 11B, and FIG. 11C and allowed in a case where the color misregistration amount is predicted.

On the other hand, in FIG. 11B, a result at the temperature measurement point B is shown. The temperature measurement point B is a point which is close to the bearing portion 69 and the IC 67 as the heat sources, which is located in an upper portion of the stepped portions 68 of the optical box 105, and through which the airflows generated by the rotation of the deflection device 43 pass. At the temperature measurement point B, over all the sections: the section t1, the section t2, and the section t3, the measured temperature and the color misregistration amount are in the proportional relationship, and the plotted values fall within the predetermined allowance limits of error defined for the prediction of the color misregistration amount. Therefore, the color misregistration amount may be predicted with a high accuracy based on the temperature measured at the temperature measurement point B.

Next, in FIG. 11C, a result at the temperature measurement point C is shown. The temperature measurement point C is a point which is located in an upper portion of a planar portion on an upper step of the stepped portions 68 of the optical box 105, which is far from the bearing portion 69 and the IC 67 as the heat sources, and which is less affected by the airflows generated by the rotation of the deflection device 43 than the temperature measurement point B. At the temperature measurement point C, in the section t1 in which the ambient temperature is increased and in the section t2, the color misregistration amount and the measured temperature are in the proportional relationship, but in the section t3, the characteristic deviates from those in the section t1 and the section t2. Therefore, the proportional relationship does not hold between the color misregistration amount and the measured temperature, and the plotted values exceed the predetermined allowance limits of error defined for the prediction of the color misregistration amount. Based on the above result, in the embodiment, in the case where the temperature is measured in order to predict the color misregistration amount, the temperature measurement point B, which is close to the bearing portion 69 and the IC 67 as the heat sources and through which the airflows generated by the rotation of the deflection device 43 pass, is selected as the temperature measurement point.

[Installation of Thermistor]

Figure 12A:
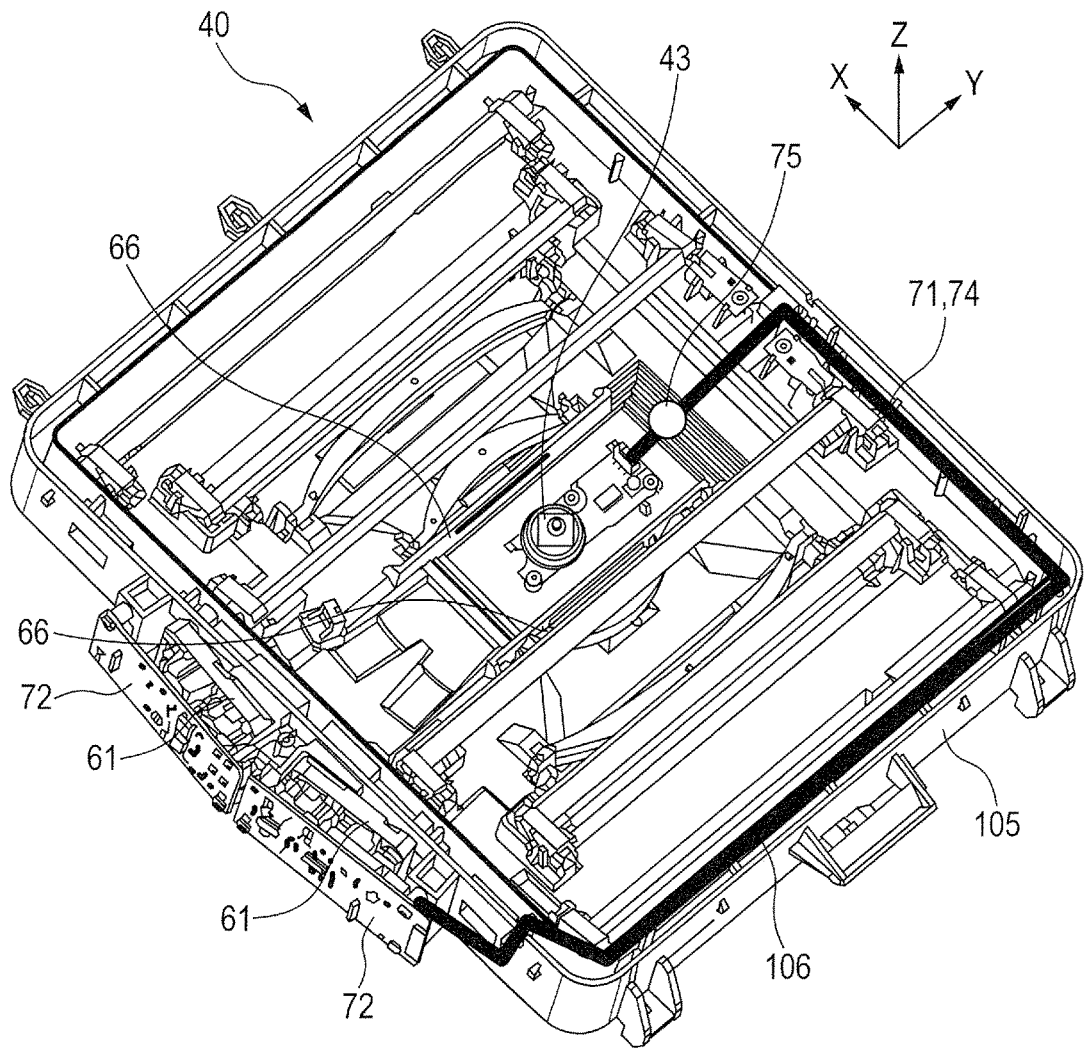
FIG. 12A is a view illustrating an electrical wire route to a thermistor and the deflection device in the embodiment.
Figure 12B:
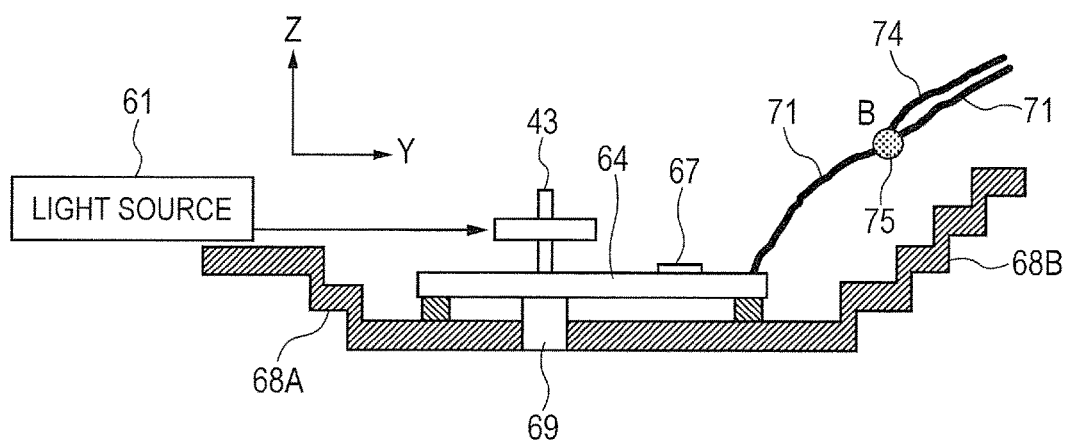
FIG. 12B is a view illustrating a fixing method for the thermistor.

FIG. 12A and FIG. 12B are views illustrating arrangement of the thermistor 75 in the embodiment. As described with reference to FIG. 10, FIG. 11A, FIG. 11B, and FIG. 11C, of the three temperature measurement points, the point at which the temperature is to be measured is determined to be the temperature measurement point B. The temperature measurement point B is located above in the Z-axis direction of the stepped portion 68B, and hence the thermistor 75 serving as the temperature detecting element configured to detect the temperature is provided as follows. First, a second signal wire (hereinafter simply referred to as "electrical wire") 74 (see FIG. 12B), which is provided in an upper portion of the stepped portion 68B of the optical box 105, and a first signal wire (hereinafter simply referred to as "electrical wire") 71 (see FIG. 12B) are connected to the control board 72 via the same route. In this case, the electrical wire 71 is an electrical wire configured to supply electric power to the deflection device 43 via the board 64 to control the deflection device 43, and the electrical wire 74 is an electrical wire configured to supply electric power to the thermistor 75 to transmit a signal as the detection result of the thermistor 75.

The electrical wires 71 and 74 connected to the control board 72 are routed along a groove portion 106 formed in a side wall of the optical box 105 to route the electrical wires as illustrated in FIG. 12A. Note that, in the embodiment, the groove portion 106 of the optical box 105 is formed in the right half of FIG. 12A, but may be formed in the left half of FIG. 12A. In this manner, the electrical wire 74 of the thermistor 75 and the electrical wire 71 of the deflection device 43 are routed along the groove portion 106 via the same route, with the result that there is no need to form routes for separate wirings. Moreover, as illustrated in FIG. 12B, in order to stably arrange the thermistor 75 in the upper portion of the stepped portion 68B of the optical box 105, the thermistor 75 is fixed to the electrical wire 71 configured to control the deflection device 43.

As described above, the point at which the temperature is measured between the light blocking walls 66 is set to the point which is close to the bearing portion 69 and the IC 67 as the heat sources, which is in the upper portion of the stepped portions 68 of the optical box 105, and through which the airflows generated by the rotation of the deflection device 43 pass, that is, the temperature measurement point B. Then, in order to arrange the thermistor 75 stably at the temperature measurement point B, the thermistor 75 is fixed to the electrical wire 71 of the deflection device 43. In this manner, the thermistor 75 is provided at the temperature measurement point B to measure the temperature so that the color misregistration amount resulting from the variations in irradiation positions of the light beams due to the change in ambient temperature of the light scanning apparatus 40 may be predicted correctly. Then, the color misregistration may be corrected based on the predicted color misregistration amount, and deterioration in image quality due to the color misregistration may be reduced. Note that, the method of predicting the color misregistration amount to correct the color misregistration has been publicly known, and hence a description thereof is omitted.

As described above, according to the embodiment, the temperature detecting unit may be provided at an appropriate position in the light scanning apparatus to reduce the color misregistration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-215617, filed Oct. 22, 2014, which is hereby incorporated by reference herein in its entirety.

What is claimed is:

1. An image forming apparatus, comprising:
   a first photosensitive member;
   a second photosensitive member;
   a first light source configured to emit a first light beam to expose the first photosensitive member to the first light beam;
   a second light source configured to emit a second light beam to expose the second photosensitive member to the second light beam;
   a deflection unit including: a rotary polygon mirror configured to deflect the first light beam so that the first light beam scans the first photosensitive member, and to deflect the second light beam so that the second light beam scans the second photosensitive member; a motor configured to rotate the rotary polygon mirror; a drive unit configured to drive the motor; and a board on which the motor and the drive unit are mounted;
   first optical elements, including a first lens and a mirror, configured to guide the first light beam deflected by the rotary polygon mirror to the first photosensitive member, wherein the first light beam deflected by the rotary polygon mirror enters the first lens first in the first optical elements;
   second optical elements, including a second lens and a mirror, configured to guide the second light beam deflected by the rotary polygon mirror to the second photosensitive member, wherein the second light beam deflected by the rotary polygon mirror enters the second lens first in the second optical elements, the second lens being disposed opposite to the first lens with respect to the rotary polygon mirror;
   an optical box, to which the first light source and the second light source are attached, configured to contain the deflection unit, the first lens, and the second lens so that the deflection unit is located between the first lens and the second lens;
   a temperature detecting element provided between the deflection unit and a side wall of the optical box on a side, on which the first light source and the second light source are not disposed, opposite to a side on which the first light source and the second light source are disposed with respect to the deflection unit in a direction perpendicular to a rotation axis of the rotary polygon mirror and an optical axis of the first lens, and between the first lens and the second lens in an optical axis direction of the first lens, the temperature detecting element being configured to detect an internal temperature of the optical box;
   a first developing unit configured to develop an electrostatic latent image, which is formed on the first photosensitive member by scanning the first light beam on the first photosensitive member, with a toner into a first toner image;
   a second developing unit configured to develop an electrostatic latent image, which is formed on the second photosensitive member by scanning the second light beam on the second photosensitive member, with a toner different in color from the toner used by the first developing unit into a second toner image;
   a transfer unit configured to transfer the first toner image developed by the first developing unit and the second toner image developed by the second developing unit onto a sheet; and
   a control unit configured to correct a misregistration among the toner images to be transferred onto the sheet based on a detection result of the temperature detecting element.

2. The image forming apparatus according to claim 1, wherein a first wall provided with a light beam passage portion through which the first light beam deflected by the rotary polygon mirror passes is provided between the rotary polygon mirror and the first lens in an optical axis direction of the first lens in the optical box, and a second wall provided with a light beam passage portion through which the second light beam deflected by the rotary polygon mirror passes is provided between the rotary polygon mirror and the second lens in an optical axis direction of the second lens in the optical box, and
   wherein the temperature detecting element is provided between the first wall and the second wall in the optical axis direction of the one of the first lens and the second lens.

3. The image forming apparatus according to claim 1, wherein the optical box includes: an installation surface on which the deflection unit is installed; a support surface provided with a first support portion configured to support at least one reflecting mirror of a plurality of reflecting mirrors configured to guide the first light beam deflected by the rotary polygon mirror to the first photosensitive member and a second support portion configured to support at least one reflecting mirror of a plurality of reflecting mirrors configured to guide the second light beam deflected by the rotary polygon mirror to the second photosensitive member, the support surface being located on a side closer to the first photosensitive member and the second photosensitive member than the rotary polygon mirror; and a stepped portion including a plurality of steps formed between the installation surface and the support surface, and
   wherein the temperature detecting element is provided in an upper portion of the stepped portion.

4. The image forming apparatus according to claim 3, further comprising a control board on which the first light source is mounted,
   wherein the deflection unit is connected to the control board by a first signal wire,
   wherein the temperature detecting element is connected to the control board by a second signal wire, and
   wherein the second signal wire is wired along a same route as the first signal wire.

5. The image forming apparatus according to claim 4, wherein the temperature detecting element is mounted on a portion of the first signal wire corresponding to the upper portion of the stepped portion.

6. The image forming apparatus according to claim 3, wherein the plurality of steps of the stepped portion are increased in height from the installation surface as approaching the support surface from the installation surface.

7. The image forming apparatus according to claim 3, wherein the optical box is made of a resin, and the stepped portion is formed integrally with the optical box.

8. An optical scanning apparatus provided in an image forming apparatus including a first photosensitive member and a second photosensitive member, the optical scanning apparatus comprising:
  a first light source configured to emit a first light beam to expose the first photosensitive member to the first light beam;
  a second light source configured to emit a second light beam to expose the second photosensitive member to the second light beam;
  a deflection unit including: a rotary polygon mirror configured to deflect the first light beam so that the first light beam scans the first photosensitive member, and to deflect the second light beam so that the second light beam scans the second photosensitive member; a motor configured to rotate the rotary polygon mirror; a drive unit configured to drive the motor; and a board on which the motor and the drive unit are mounted;
  first optical elements including a first lens and a mirror configured to guide the first light beam deflected by the rotary polygon mirror to the first photosensitive member, wherein the first light beam deflected by the rotary polygon mirror enters the first lens first in the first optical elements;
  second optical elements, including a second lens and a mirror, configured to guide the second light beam deflected by the rotary polygon mirror to the second photosensitive member, wherein the second light beam deflected by the rotary polygon mirror enters the second lens first in the second optical elements, the second lens being disposed opposite to the first lens with respect to the rotary polygon mirror;
  an optical box, to which the first light source and the second light source are attached, configured to contain the deflection unit, the first lens, and the second lens so that the deflection unit is located between the first lens and the second lens; and
  a temperature detecting element provided between the deflection unit and a side wall of the optical box on a side, on which the first light source and the second light source are not disposed, opposite to a side on which the first light source and the second light source are disposed with respect to the deflection unit in a direction perpendicular to a rotation axis of the rotary polygon mirror and an optical axis of the first lens, and between the first lens and the second lens in an optical axis direction of the first lens, the temperature detecting element being configured to detect an internal temperature of the optical box.

9. The optical scanning apparatus according to claim 8, wherein a first wall provided with a light beam passage portion through which the first light beam deflected by the rotary polygon mirror passes is provided between the rotary polygon mirror and the first lens in an optical axis direction of the first lens in the optical box, and a second wall provided with a light beam passage portion through which the second light beam deflected by the rotary polygon mirror passes is provided between the rotary polygon mirror and the second lens in an optical axis direction of the second lens in the optical box, and
  wherein the temperature detecting element is provided between the first wall and the second wall in the optical axis direction of the one of the first lens and the second lens.

10. The optical scanning apparatus according to claim 8, wherein the optical box includes: an installation surface on which the deflection unit is installed; a support surface provided with a first support portion configured to support at least one reflecting mirror of a plurality of reflecting mirrors configured to guide the first light beam deflected by the rotary polygon mirror to the first photosensitive member and a second support portion configured to support at least one reflecting mirror of a plurality of reflecting mirrors configured to guide the second light beam deflected by the rotary polygon mirror to the second photosensitive member, the support surface being located on a side closer to the first photosensitive member and the second photosensitive member than the rotary polygon mirror; and a stepped portion including a plurality of steps formed between the installation surface and the support surface, and
  wherein the temperature detecting element is provided in an upper portion of the stepped portion.

11. The optical scanning apparatus according to claim 10, further comprising a control board on which the first light source is mounted,
  wherein the deflection unit is connected to the control board by a first signal wire,
  wherein the temperature detecting element is connected to the control board by a second signal wire, and
  wherein the second signal wire is wired along a same route as the first signal wire.

12. The optical scanning apparatus according to claim 11, wherein the temperature detecting element is mounted on a portion of the first signal wire corresponding to the upper portion of the stepped portion.

13. The optical scanning apparatus according to claim 10, wherein the plurality of steps of the stepped portion are increased in height from the installation surface as approaching the support surface from the installation surface.

14. The optical scanning apparatus according to claim 10, wherein the optical box is made of a resin, and the stepped portion is formed integrally with the optical box.

15. An image forming apparatus, comprising:
  four photosensitive members including a first photosensitive member, a second photosensitive member, a third photosensitive member, and a fourth photosensitive member, each of the four photosensitive members bearing a toner image, and each of the four photosensitive members corresponding to a different one of four toners including yellow toner, cyan toner, magenta toner, and black toner;
  a light scanning apparatus comprising:
    a first light source configured to emit a first light beam;
    a second light source configured to emit a second light beam;
    a third light source configured to emit a third light beam;
    a fourth light source configured to emit a fourth light beam;
    a deflection unit including: a rotary polygon mirror configured to deflect the first light beam, the second light beam, the third light beam, and the fourth light beam so that the first light beam scans the first photosensitive member, the second light beam scans the second photosensitive member, the third light beam scans the third photosensitive member, and the fourth light beam scans the fourth photosensitive member; a motor configured to rotate the rotary polygon mirror; a drive unit configured to drive the motor; and a board on which the motor and the drive unit are mounted;

a first lens which the first light beam and the third light beam deflected by the rotary polygon mirror enter first, the first lens being included in a plurality of optical elements configured to guide the first light beam, the second light beam, the third light beam, and the fourth light beam to the first photosensitive member, the second photosensitive member, the third photosensitive member, and the fourth photosensitive member, respectively;

a second lens which the second light beam and the fourth light beam deflected by the rotary polygon mirror enter first, the second lens being included in the plurality of optical elements and being disposed opposite to the first lens with respect to the rotary polygon mirror;

an optical box, to which the first light source, the second light source, the third light source, and the fourth light source are attached, configured to contain the deflection unit, the first lens, and the second lens so that the deflection unit is located between the first lens and the second lens; and a temperature detecting element provided between the deflection unit and a side wall of the optical box on a side opposite to a side on which the first light source, the second light source, the third light source, and the fourth light source are disposed with respect to the deflection unit in a direction perpendicular to a rotation axis of the rotary polygon mirror and an optical axis of the first lens, and between the first lens and the second lens in an optical axis direction of the first lens, the temperature detecting element being configured to detect an internal temperature of the optical box;

wherein the image forming apparatus further comprises:
a transfer unit configured to transfer toner images on the four photosensitive members onto a sheet; and
a control unit configured to correct a misregistration among the toner images to be transferred onto the sheet based on a detection result of the temperature detecting element.

16. The image forming apparatus according to claim 15, wherein a first wall provided with a light beam passage portion through which the first light beam and the third light beam deflected by the rotary polygon mirror pass is provided between the rotary polygon mirror and the first lens in the optical axis direction of the first lens in the optical box, and a second wall provided with a light beam passage portion through which the second light beam and the fourth light beam deflected by the rotary polygon mirror pass is provided between the rotary polygon mirror and the second lens in an optical axis direction of the second lens in the optical box, and wherein the temperature detecting element is provided between the first wall and the second wall in the optical axis direction of the one of the first lens and the second lens.

17. The image forming apparatus according to claim 15, wherein the optical box includes: an installation surface on which the deflection unit is installed; a support surface provided with a first support portion configured to support at least one reflecting mirror of a plurality of reflecting mirrors configured to guide the first light beam deflected by the rotary polygon mirror to the first photosensitive member and a second support portion configured to support at least one reflecting mirror of a plurality of reflecting mirrors configured to guide the second light beam deflected by the rotary polygon mirror to the second photosensitive member, the support surface being located on a side closer to the first photosensitive member and the second photosensitive member than the rotary polygon mirror; and a stepped portion including a plurality of steps formed between the installation surface and the support surface, and wherein the temperature detecting element is provided in an upper portion of the stepped portion.

18. The image forming apparatus according to claim 17, further comprising a control board on which the first light source is mounted, wherein the deflection unit is connected to the control board by a first signal wire,
wherein the temperature detecting element is connected to the control board by a second signal wire, and
wherein the second signal wire is wired along a same route as the first signal wire.

19. The image forming apparatus according to claim 18, wherein the temperature detecting element is mounted on a portion of the first signal wire corresponding to the upper portion of the stepped portion.

20. The image forming apparatus according to claim 17, wherein the plurality of steps of the stepped portion are increased in height from the installation surface as approaching the support surface from the installation surface.

21. The image forming apparatus according to claim 17, wherein the optical box is made of a resin, and the stepped portion is formed integrally with the optical box.

22. A light scanning apparatus attached to an image forming apparatus comprising four photosensitive members including a first photosensitive member, a second photosensitive member, a third photosensitive member, and a fourth photosensitive member, each of the four photosensitive members bearing a toner image, and each of the four photosensitive members corresponding to a different one of four toners including yellow toner, cyan toner, magenta toner, and black toner, the light scanning apparatus comprising:

a first light source configured to emit a first light beam;
a second light source configured to emit a second light beam;
a third light source configured to emit a third light beam;
a fourth light source configured to emit a fourth light beam;
a deflection unit including: a rotary polygon mirror configured to deflect the first light beam, the second light beam, the third light beam, and the fourth light beam so that the first light beam scans the first photosensitive member, the second light beam scans the second photosensitive member, the third light beam scans the third photosensitive member, and the fourth light beam scans the fourth photosensitive member; a motor configured to rotate the rotary polygon mirror; a drive unit configured to drive the motor; and a board on which the motor and the drive unit are mounted;
a first lens which the first light beam and the third light beam deflected by the rotary polygon mirror enter first, the first lens being included in a plurality of optical elements configured to guide the first light beam, the second light beam, the third light beam, and the fourth light beam to the first photosensitive member, the second photosensitive member, the third photosensitive member, and the fourth photosensitive member, respectively;
a second lens which the second light beam and the fourth light beam deflected by the rotary polygon mirror enter first, the second lens being included in the plurality of optical elements and being disposed opposite to the first lens with respect to the rotary polygon mirror;
an optical box, to which the first light source, the second light source, the third light source, and the fourth light source are attached, configured to contain the deflection unit, the first lens, and the second lens so that the deflection unit is located between the first lens and the second lens; and
a temperature detecting element provided between the deflection unit and a side wall of the optical box on a side opposite to a side on which the first light source, the second light source, the third light source, and the fourth light source are disposed with respect to the deflection unit in a direction perpendicular to a rotation axis of the rotary polygon mirror and an optical axis of the first lens, and between the first lens and the second lens in an optical axis direction of the first lens, the temperature detecting element being configured to detect an internal temperature of the optical box.

23. The image forming apparatus according to claim 1, further comprising a first signal wire, one end of which is connected to the board and the other end of which is disposed outside the optical box, configured to send a signal for driving the motor,
wherein the temperature detecting element is fixed to the first signal wire.

24. The image forming apparatus according to claim 23, further comprising a second signal wire, one end of which is connected to the temperature detecting element and the other end of which is disposed outside the optical box, configured to send a signal from the temperature detecting element,
wherein the second signal wire is disposed along the first signal wire.

25. The image forming apparatus according to claim 24, further comprising a control board, attached to an outside of the optical box, configured to drive the first light source,
wherein the other end of the first signal wire and the other end of the second signal wire are connected to the control board.

26. The optical scanning apparatus according to claim 8, further comprising a first signal wire, one end of which is connected to the board and the other end of which is disposed outside the optical box, configured to send a signal for driving the motor,
wherein the temperature detecting element is fixed to the first signal wire.

27. The optical scanning apparatus according to claim 26, further comprising a second signal wire, one end of which is connected to the temperature detecting element and the other end of which is disposed outside the optical box, configured to send a signal from the temperature detecting element,
wherein the second signal wire is disposed along the first signal wire.

28. The optical scanning apparatus according to claim 27, further comprising a control board, attached to an outside of the optical box, configured to drive the first light source,
wherein the other end of the first signal wire and the other end of the second signal wire are connected to the control board.

29. The image forming apparatus according to claim 15, further comprising a first signal wire, one end of which is connected to the board and the other end of which is disposed outside the optical box, configured to send a signal for driving the motor,
wherein the temperature detecting element is fixed to the first signal wire.

30. The image forming apparatus according to claim 29, further comprising a second signal wire, one end of which is connected to the temperature detecting element and the other end of which is disposed outside the optical box, configured to send a signal from the temperature detecting element,
wherein the second signal wire is disposed along the first signal wire.

31. The image forming apparatus according to claim 30, further comprising a control board, attached to an outside of the optical box, configured to drive the first light source,
wherein the other end of the first signal wire and the other end of the second signal wire are connected to the control board.

32. The optical scanning apparatus according to claim 22, further comprising a first signal wire, one end of which is connected to the board and the other end of which is disposed outside the optical box, configured to send a signal for driving the motor,
wherein the temperature detecting element is fixed to the first signal wire.

33. The optical scanning apparatus according to claim 32, further comprising a second signal wire, one end of which is connected to the temperature detecting element and the other end of which is disposed outside the optical box, configured to send a signal from the temperature detecting element,
wherein the second signal wire is disposed along the first signal wire.

34. The optical scanning apparatus according to claim 33, further comprising a control board, attached to an outside of the optical box, configured to drive the first light source,
wherein the other end of the first signal wire and the other end of the second signal wire are connected to the control board.

* * * * *